(12) United States Patent
Ahn

(10) Patent No.: US 8,520,032 B2
(45) Date of Patent: Aug. 27, 2013

(54) LIQUID CRYSTAL DISPLAY AND METHOD OF DRIVING THE SAME

(75) Inventor: Jiyoung Ahn, Anyang-si (KR)

(73) Assignee: LG Display Co. Ltd., Seoul (KR)

( * ) Notice: Subject to any disclaimer, the term of this patent is extended or adjusted under 35 U.S.C. 154(b) by 632 days.

(21) Appl. No.: 12/541,510

(22) Filed: Aug. 14, 2009

(65) Prior Publication Data

US 2010/0039455 A1   Feb. 18, 2010

(30) Foreign Application Priority Data

Aug. 14, 2008 (KR) .................. 10-2008-0079919
Jul. 23, 2009 (KR) .................. 10-2009-0067456

(51) Int. Cl.
*G09G 5/10* (2006.01)
*G09G 3/36* (2006.01)

(52) U.S. Cl.
USPC ............... 345/690; 345/87; 345/88; 345/89

(58) Field of Classification Search
USPC .............. 345/65, 77, 81, 88, 89, 207, 690
See application file for complete search history.

(56) References Cited

U.S. PATENT DOCUMENTS

| | | | | |
|---|---|---|---|---|
| 4,786,968 A | * | 11/1988 | Kutner | 348/674 |
| 2001/0026283 A1 | * | 10/2001 | Yoshida et al. | 345/600 |
| 2001/0050778 A1 | * | 12/2001 | Fukuda et al. | 358/1.9 |
| 2007/0091082 A1 | * | 4/2007 | Huang | 345/207 |
| 2009/0015601 A1 | * | 1/2009 | Kim | 345/690 |

FOREIGN PATENT DOCUMENTS

| | | |
|---|---|---|
| CN | 101191926 A | 6/2008 |
| JP | 2003322837 A | 11/2003 |
| JP | 2004272156 A | 9/2004 |
| JP | 2008170683 A | 7/2008 |

OTHER PUBLICATIONS

Office Action issued in corresponding Chinese Patent Application No. 200910159298.X, mailed Aug. 10, 2011.
Office Action issued in corresponding Japanese Patent Application No. 2009-183238, mailed Jan. 17, 2012.
Haubner, P. "A Unified Relationship between Brightness and Luminance" Presented at the 19th Session of the International Commission on Illumination (CIE) Kyoto, Japan 1979.

* cited by examiner

*Primary Examiner* — Alexander Eisen
*Assistant Examiner* — Mark Regn
(74) *Attorney, Agent, or Firm* — Brinks Hofer Gilson & Lione

(57) ABSTRACT

A liquid crystal display and a method of driving the same are disclosed. The liquid crystal display includes a liquid crystal display panel for displaying an image, an external light sensing unit for sensing an illuminance of external light around the liquid crystal display panel, a backlight unit whose an output luminance is controlled by an adjustment dimming signal, and a gamma curve adjusting circuit for modulating digital video data or varying resistances of variable resistors constituting a gamma resistor string based on the illuminance of external light or according to a relative maximum white luminance based on the adjustment dimming signal, so as to uniformly keep a relative brightness of the input image a user perceives irrespective of changes in the illuminance of external light.

3 Claims, 26 Drawing Sheets

LIQUID CRYSTAL DISPLAY AND METHOD OF DRIVING THE SAME

RELATED APPLICATIONS

This application claims the benefit of the Korean Patent Application No. 10-2008-0079919 filed Aug. 14, 2008 and Korea Patent Application No. 10-2009-0067456 filed on Jul. 23, 2009, the entire contents of which is incorporated herein by reference for all purposes as if fully set forth herein.

BACKGROUND

1. Field of the Invention

Embodiments of the disclosure relate to a liquid crystal display and a method of driving the same for solving a distortion phenomenon of the image quality resulting from external light.

2. Discussion of the Related Art

Liquid crystal displays generally display an image by controlling a light transmittance of a liquid crystal layer using an electric field applied to the liquid crystal layer in response to a video signal. Because the liquid crystal displays are small-sized thin profile flat panel displays with low power consumption, the liquid crystal displays have been used in personal computers such as notebook PCs, office automation equipment, audio/video equipment, and the like. In particular, because active matrix type liquid crystal displays whose each liquid crystal cell includes a switching element can actively control the switching elements, the active matrix type liquid crystal displays have an advantage in displaying a moving picture.

A thin film transistor (TFT) has been mainly used as the switching element of the active matrix type liquid crystal displays.

As shown in FIG. 1, an active matrix type liquid crystal display charges a liquid crystal cell Clc to a data voltage by converting digital video data into an analog data voltage based on a gamma reference voltage and simultaneously performing a supply of the analog data voltage to a data line DL and a supply of a scan pulse to a gate line GL. For the above-described operation, a gate electrode of a TFT used as a switching element is connected to the gate line GL, a source electrode of the TFT is connected to the data line DL, and a drain electrode of the TFT is connected to a pixel electrode of the liquid crystal cell Clc and an electrode at one side of a storage capacitor Cst. A common voltage Vcom is supplied to a common electrode of the liquid crystal cell Clc. When the TFT is turned on, the storage capacitor Cst is charged to the data voltage applied through the data line DL to keep a voltage of the liquid crystal cell Clc constant. When the scan pulse is applied to the gate line GL, the TFT is turned on. Hence, a channel is formed between the source electrode and the drain electrode of the TFT, and a voltage on the data line DL is supplied to the pixel electrode of the liquid crystal cell Clc. An arrangement state of liquid crystal molecules of the liquid crystal cell Clc changes because of an electric field between the pixel electrode and the common electrode, and thus incident light is modulated.

The liquid crystal display generally displays an image according to a previously determined gamma curve of 1.8 to 2.2 gamma irrespective of a watching environment (for example, a illuminance of external light). However, the image quality a user perceives may be easily distorted by changes in the watching environment. A distortion phenomenon of the image quality is described with reference to FIGS. 2 to 4. FIG. 2 illustrates an image in a living room environment of a middle brightness, FIG. 3 illustrates an image in a relatively brighter living room environment than the middle brightness, and FIG. 4 illustrates an image in a relatively darker living room environment than the middle brightness. In FIGS. 2 to 4, a gamma curve means a curve obtained by connecting output luminances respectively corresponding to input gray levels, and the brightness means a relative brightness of an image perceived when the user perceives the output luminance being an absolute concept.

To prevent the distortion phenomenon of the image quality, as shown in FIG. 2, the relative brightness of the image has to be kept at an original brightness level of the image irrespective of changes in the watching environment and must have a good linearity in all of gray level periods. However, as shown in FIG. 3, a relative brightness of an image in the brighter living room environment is less than an original brightness level of the image and does not have a good linearity in a low gray level region "A" because of a sensitivity reduction resulting from a reduction of an iris stop. Hence, it is difficult for the user to perceive the image in the low gray level region "A" of the brighter living room environment. Further, as shown in FIG. 4, a relative brightness of an image in the darker living room environment is greater than an original brightness level of the image and does not have a good linearity in a low gray level region "A" and a high gray level region "B" because of a sensitivity improvement resulting from an increase of an iris stop. Hence, in the darker living room environment, a contour occurs between gray levels in an image of the low gray level region "A", and a glare phenomenon occurs in an image of the high gray level region "B".

As described above, the distortion phenomenon of the image quality in the specific gray level regions as shown in FIGS. 3 and 4 is caused by the fact that the image is displayed according to the previously determined gamma curve irrespective of changes in the watching environment. In the related art, a method of modulating a gamma curve in a specific gray level range was proposed so as to improve visibility at the specific gray level range. However, the method does not consider the fact that a relative brightness of an image a user perceives must be kept at an original brightness level of the image irrespective of changes in watching environment and must have a good linearity in all of gray level periods. Therefore, the related art has a limit in uniformly keeping the relative brightness of the image the user perceives at an original brightness level of the image irrespective of changes in the watching environment.

BRIEF SUMMARY

Embodiments of the disclosure provide a liquid crystal display and a method of driving the same capable of uniformly keeping a relative brightness of an image a user perceives at an original brightness level of the image irrespective of changes in watching environment.

In one aspect, there is a liquid crystal display comprising a liquid crystal display panel for displaying an image, an external light sensing unit for sensing an illuminance of external light around the liquid crystal display panel, and a gamma curve adjusting circuit for modulating digital video data based on the illuminance of external light.

The gamma curve adjusting circuit includes a gamma curve setting unit for selecting a first gamma curve information corresponding to the illuminance of external light among gamma curve informations of each intensity of a previously determined illuminance of external light to output the first gamma curve information as a selected gamma curve information, so that the relative brightness of the image the user perceives has a good linearity in all of gray level periods, and a data mapping unit for modulating the digital video data using a lookup table corresponding to the selected gamma curve information.

The gamma curve adjusting circuit further includes a gamma curve estimating and determining unit calculating a relative brightness function for each gray level based on the first gamma curve information, comparing a linearity for each gray level of the relative brightness function with a previously determined reference value, and outputting the first gamma curve information or a second gamma curve information different from the first gamma curve information as the selected gamma curve information according to a comparison result. The second gamma curve information has a maximum linearity for each gray level of the relative brightness function among the gamma curve informations other than the first gamma curve information.

The gamma curve adjusting circuit includes a gamma curve conversion controller calculating a relative brightness function for each gray level based on a reference gamma curve previously determined according to the illuminance of external light, comparing a linearity for each gray level of the relative brightness function with a previously determined reference value, and generating an operation control signal for a modulation of the digital video data, and a gamma curve conversion unit expanding a number of gray levels from $2^k$ to $2^m$ through data bit expansion from k-bit to m-bit in response to the operation control signal, equally dividing a relative brightness curve in a plane comprised of the gray levels $2^m$ and a luminance by the k-bit, mapping the gray levels $2^k$ to the equally divided gray levels $2^m$ to change gray levels, and modulating the digital video data in conformity with the changed gray levels.

The gamma curve adjusting circuit includes a first gamma curve setting unit setting a first gamma curve information corresponding to each intensity of an illuminance information of external light and outputting a gamma curve information within a range including the illuminance of external light, a second gamma curve setting unit outputting a gamma curve information corresponding to the illuminance of external light among second gamma curve informations of each intensity of a previously determined illuminance of external light, a multiplexer selecting one of outputs of the first and second gamma curve setting units as a first selection gamma curve information depending on whether or not the illuminance information of external light is inclined in the digital video data, and a data mapping unit modulating the digital video data using a lookup table corresponding to the first selection gamma curve information.

The gamma curve adjusting circuit further includes a gamma curve estimating and determining unit calculating a relative brightness function for each gray level based on the first selection gamma curve information, comparing a linearity for each gray level of the relative brightness function with a previously determined reference value, and outputting the first selection gamma curve information or a second selection gamma curve information different from the first selection gamma curve information according to a comparison result. The second selection gamma curve information has a maximum linearity for each gray level of the relative brightness function among the gamma curve informations other than the first selection gamma curve information.

In another aspect, there is a liquid crystal display comprising a liquid crystal display panel for displaying an image, an external light sensing unit for sensing an illuminance of external light around the liquid crystal display panel, a backlight unit whose an output luminance is controlled by an adjustment dimming signal, and a gamma curve adjusting circuit for modulating digital video data according to a relative maximum white luminance based on the adjustment dimming signal to uniformly keep a relative brightness of the input image a user perceives irrespective of changes in the illuminance of external light.

The gamma curve adjusting circuit includes a dimming ratio adjusting unit for generating the adjustment dimming signal, a maximum luminance calculating unit for calculating the relative maximum white luminance, a gamma curve conversion controller for calculating a relative brightness function for each gray level based on a reference gamma curve previously determined according to the relative maximum white luminance, comparing a linearity for each gray level of the relative brightness function with a previously determined reference value, and generating an operation control signal for a modulation of the digital video data, and a gamma curve conversion unit expanding a number of gray levels from $2^k$ to $2^m$ through data bit expansion from k-bit to m-bit in response to the operation control signal, equally dividing a relative brightness curve in a plane comprised of the gray levels $2^m$ and a luminance by the k-bit, mapping the gray levels $2^k$ to the equally divided gray levels $2^m$ to change gray levels, and modulating the digital video data in conformity with the changed gray levels.

The gamma curve adjusting circuit further includes a video signal analyzing unit analyzing the digital video data corresponding to one frame to extract data having a maximum gray level or a minimum gray level.

In another aspect, there is a liquid crystal display comprising a liquid crystal display panel for displaying an image, an external light sensing unit for sensing an illuminance of external light around the liquid crystal display panel, and a gamma curve adjusting circuit for varying resistances of variable resistors constituting a gamma resistor string based on the illuminance of external light to uniformly keep a relative brightness of the input image a user perceives irrespective of changes in the illuminance of external light.

In another aspect, there is a liquid crystal display comprising a liquid crystal display panel for displaying an image, an external light sensing unit for sensing an illuminance of external light around the liquid crystal display panel, a backlight unit whose an output luminance is controlled by an adjustment dimming signal, and a gamma curve adjusting circuit for varying resistances of variable resistors constituting a gamma resistor string according to a relative maximum white luminance based on the adjustment dimming signal to uniformly keep a relative brightness of the input image a user perceives irrespective of changes in the illuminance of external light.

In another aspect, there is a method of driving a liquid crystal display including a liquid crystal display panel displaying an image, the method comprising sensing an illuminance of external light around the liquid crystal display panel, and modulating digital video data based on the illuminance of external light to uniformly keep a relative brightness of the input image a user perceives irrespective of changes in the illuminance of external light.

In another aspect, there is a method of driving a liquid crystal display including a liquid crystal display panel displaying an image and a backlight unit whose an output luminance is controlled by an adjustment dimming signal, the method comprising sensing an illuminance of external light around the liquid crystal display panel, and modulating digital video data according to a relative maximum white luminance based on the adjustment dimming signal to uniformly keep a relative brightness of the input image a user perceives irrespective of changes in the illuminance of external light.

In another aspect, there is a method of driving a liquid crystal display including a liquid crystal display panel displaying an image, the method comprising sensing an illuminance of external light around the liquid crystal display panel, and varying resistances of variable resistors constituting a gamma resistor string based on the illuminance of external light to uniformly keep a relative brightness of the input image a user perceives irrespective of changes in the illuminance of external light.

In another aspect, there is a method of driving a liquid crystal display including a liquid crystal display panel displaying an image and a backlight unit whose an output luminance is controlled by an adjustment dimming signal, the method comprising sensing an illuminance of external light around the liquid crystal display panel, and varying resistances of variable resistors constituting a gamma resistor string according to a relative maximum white luminance based on the adjustment dimming signal to uniformly keep a relative brightness of the input image a user perceives irrespective of changes in the illuminance of external light.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE DRAWINGS AND THE PRESENTLY PREFERRED EMBODIMENTS

Reference will now be made in detail embodiments of the disclosure examples of which are illustrated in the accompanying drawings.

FIGS. 5 to 20 illustrate a liquid crystal display and a method of driving the same capable of uniformly keeping a relative brightness of an image a user perceives at an original brightness level of the image through for example, a modulation of input data, irrespective of changes in watching environment.

Figure 5:
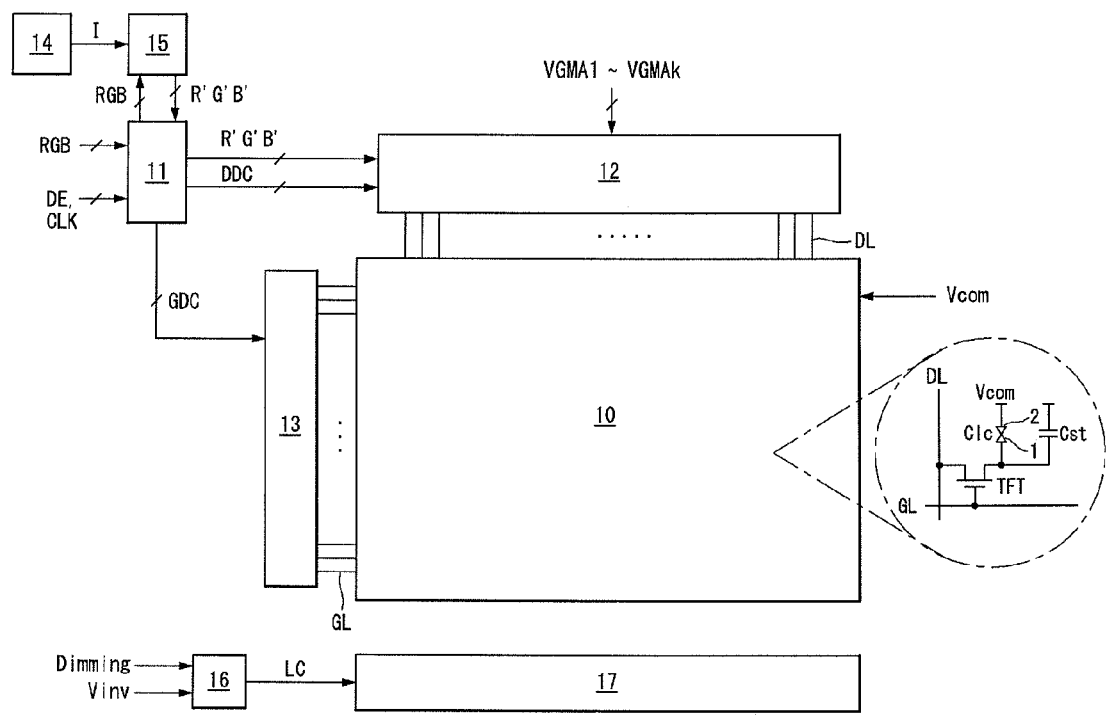
FIG. 5 is a block diagram of a liquid crystal display according to a first exemplary embodiment of the disclosure.

As shown in FIG. 5, a liquid crystal display according to a first exemplary embodiment of the disclosure includes a liquid crystal display panel 10, a timing controller 11, a data drive circuit 12, a gate drive circuit 13, an external light sensing unit 14, a gamma curve adjusting circuit 15, an inverter 16, and a backlight unit 17.

The liquid crystal display panel 10 includes an upper glass substrate, a lower glass substrate, and a liquid crystal layer between the upper and lower glass substrates. The liquid crystal display panel 10 includes m×n liquid crystal cells Clc arranged in a matrix format at each crossing of m data lines DL and n gate lines GL.

The data lines DL, the gate lines GL, thin film transistors (TFTs), and a storage capacitor Cst are formed on the lower glass substrate of the liquid crystal display panel 10. The liquid crystal cells Clc are connected to the TFTs and are driven by an electric field between pixel electrodes 1 and a common electrode 2. A black matrix, a color filter, and the common electrode 2 are formed on the upper glass substrate of the liquid crystal display panel 10. The common electrode 2 may be formed on the upper glass substrate in a vertical electric drive manner, such as a twisted nematic (TN) mode and a vertical alignment (VA) mode. The common electrode 2 and the pixel electrode 1 may be formed on the lower glass substrate in a horizontal electric drive manner, such as an in-plane switching (IPS) mode and a fringe field switching (FFS) mode. Polarizing plates are attached respectively to the upper and lower glass substrates. Alignment layers for setting a pre-tilt angle of liquid crystals are respectively formed on the upper and lower glass substrates.

The timing controller 11 receives timing signals, such as a data enable signal DE and a dot clock signal CLK from an external system board (not shown) to generate a data timing control signal DDC for controlling operation timing of the data drive circuit 12 and a gate timing control signal GDC for controlling operation timing of the gate drive circuit 13.

The gate timing control signal GDC includes a gate start pulse GSP, a gate shift clock signal GSC, a gate output enable signal GOE, and the like. The data timing control signal DDC includes a source sampling clock signal SSC, a source output enable signal SOE, a polarity control signal POL, and the like.

The timing controller 11 rearranges modulation digital video data R'G'B' received from the gamma curve adjusting circuit 15 in conformity with a resolution of the liquid crystal display panel 10 to supply the rearranged modulation digital video data R'G'B' to the data drive circuit 12.

The data drive circuit 12 converts the modulation digital video data R'G'B' into an analog gamma compensation voltage based on gamma reference voltages VGMA1 to VGMAk in response to the data timing control signal DDC received from the timing controller 11 to supply the analog gamma compensation voltage as a data voltage to the data lines DL of the liquid crystal display panel 10. For the above operation, the data drive circuit 12 includes a plurality of data drive integrated circuits (ICs) each including a shift register, a resistor, a latch, a digital-to-analog converter, a multiplexer, an output buffer, and so on. The shift register samples a clock signal, and the register temporarily stores digital video data RGB. The latch stores data of each line in response to the clock signal sampled by the shift register and simultaneously outputs the data of each line. The digital-to-analog converter selects a positive or negative gamma voltage based on a gamma reference voltage in response to digital data from the latch. The multiplexer selects the data lines DL receiving analog data converted from the positive/negative gamma voltage. The output buffer is connected between the multiplexer and the data lines DL.

The gate drive circuit 13 sequentially supplies scan pulses for selecting horizontal lines of the liquid crystal display panel 10, to which the data voltage will be supplied, to the gate lines GL. For the above operation, the gate drive circuit 13 includes a plurality of gate drive ICs each including a shift register, a level shifter for shifting an output signal of the shift register to a swing width suitable for a TFT drive of the liquid crystal cell Clc, and an output buffer connected between the level shifter and the gate lines GL.

The external light sensing unit 14 includes a known optical sensor to sense an illuminance I of external light around the liquid crystal display panel 10. The sensed illuminance I of external light is supplied to the gamma curve adjusting circuit 15.

The gamma curve adjusting circuit 15 modulates the digital video data RGB based on the illuminance I of external light or based on an adjustment dimming signal according to the illuminance I of external light or an input image to generate the modulation digital video data R'G'B', so that a relative brightness of an image a user perceives is uniformly kept irrespective of changes in watching environment. The relative brightness of the image the user perceives is uniformly kept at an original brightness level of the image irrespective of changes in watching environment and has a good linearity in all of gray level periods due to the modulation digital video data R'G'B'. The gamma curve adjusting circuit 15 will be described later with reference to FIGS. 6 to 20. In a liquid crystal display using an YCbCr color space instead of an RGB color space, the gamma curve adjusting circuit 15 may generate modulation digital video data Y'Cb'Cr' in the same manner as a generating manner of the modulation digital video data R'G'B'. Hereinafter, the modulation digital video data R'G'B' based on the RGB color space will be described for the convenience of explanation.

The inverter 16 generates a backlight control signal LC in conformity with an input dimming signal using a DC voltage Vinv received from a system board (not shown). For the above-described operation, the inverter 16 includes a pulse width modulation (PWM) controller for controlling a lighting-up period of the backlight unit 17 depending on the dimming signal, a switching unit for converting the DC voltage Vinv into an AC voltage under the control of the PWM controller, a transformer that raise the AC voltage to supply the raised AC voltage, and a feedback circuit for inspecting a driving signal supplied to the backlight unit 17.

The backlight unit 17 may be mainly classified into a direct type backlight unit and an edge type backlight unit. The edge type backlight unit has a structure in which a plurality of light sources are positioned opposite a light guide plate and a plurality of optical sheets are positioned between the liquid crystal display panel 10 and the light guide plate. The direct type backlight unit has a structure in which a plurality of optical sheets and a diffusion plate are positioned under the liquid crystal display panel 10 and a plurality of light sources are positioned under the diffusion plate. The backlight unit 17 may be applied to a backlit liquid crystal display in which the liquid crystal display panel 10 transmits light from a light source to display an image. The backlight unit 17 may be omitted in a reflective liquid crystal display in which the liquid crystal display panel 10 reflects external light to display an image. Because the embodiments of the disclosure may be applied to both the backlit liquid crystal display and the reflective liquid crystal display, the backlight unit 17 is not necessarily required in the embodiments of the disclosure.

Figure 6:
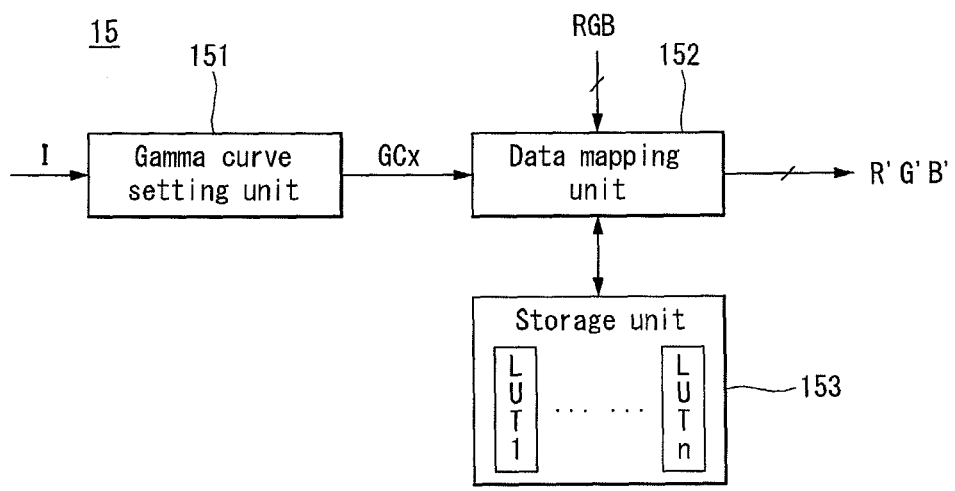
FIG. 6 illustrates a first exemplary configuration of a gamma curve adjusting circuit.

FIG. 6 illustrates a first exemplary configuration of the gamma curve adjusting circuit 15.

As shown on FIG. 6, the gamma curve adjusting circuit 15 includes a gamma curve setting unit 151, a data mapping unit 152, and a storage unit 153.

The gamma curve setting unit 151 selects a gamma curve information GCx corresponding to the illuminance I of external light received from the external light sensing unit 14 among gamma curve informations of each intensity of a previously determined illuminance of external light to output the selected gamma curve information GCx. The intensity of the illuminance of external light is divided into a plurality of levels, and thus gamma curve informations correspond to each level of the intensity of the illuminance of external light. For example, a gamma curve information GC1 corresponds to the illuminance of external light whose an intensity is less than A1, a gamma curve information GC2 corresponds to the illuminance of external light whose an intensity is equal to or greater than A1 and less than A2, a gamma curve information GC3 corresponds to the illuminance of external light whose an intensity is equal to or greater than A2 and less than A3, a gamma curve information GC4 corresponds to the illuminance I of external light whose an intensity is equal to or greater than A3 and less than A4, and a gamma curve information GCn corresponds to the illuminance of external light whose an intensity is equal to or greater than A(n-1) and less than An. Each gamma curve information is determined so that a relative brightness of an image that a user perceives at a level of the corresponding illuminance of external light, is kept at an original brightness level of the image and has a good linearity in all gray level periods.

Figure 1:
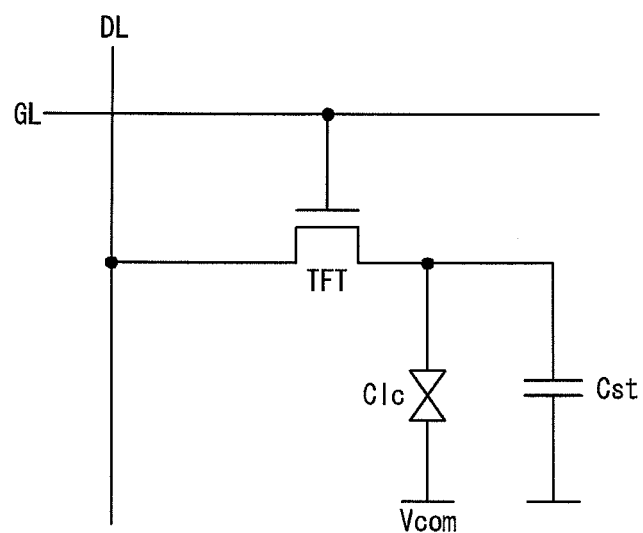
FIG. 1 is an equivalent circuit diagram of a pixel of a general liquid crystal display.
Figure 2:
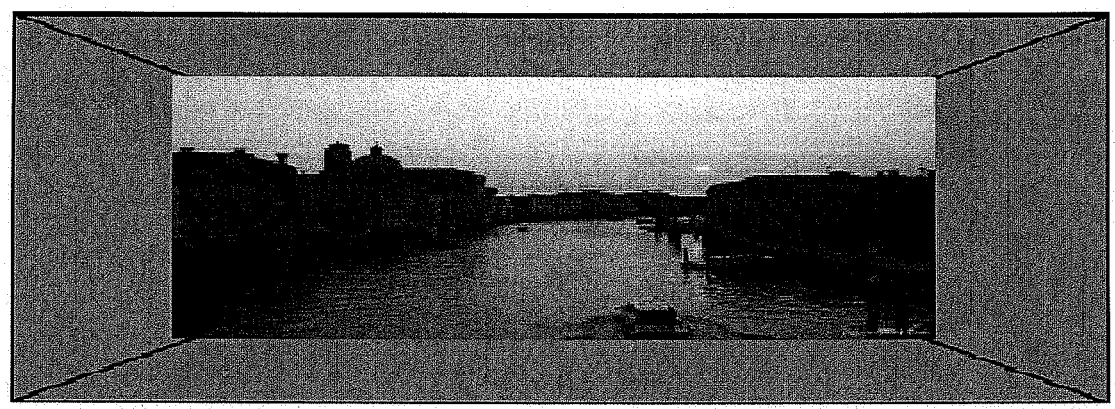
FIG. 2 illustrates an image in a living room environment of a middle brightness.
Figure 2:
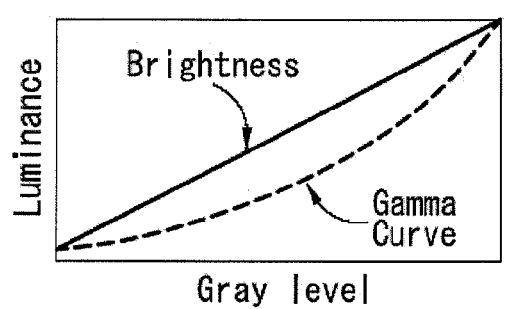
Figure 3:
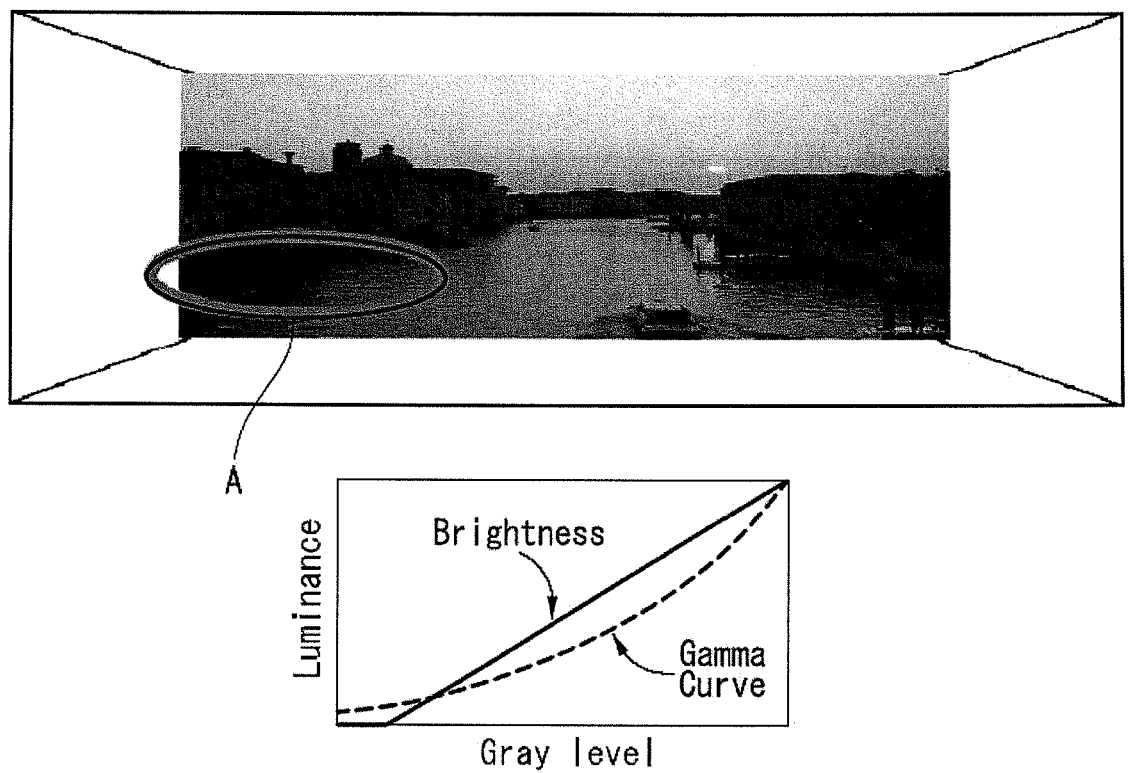
FIG. 3 illustrates an image in a relatively brighter living room environment than a middle brightness.
Figure 4:
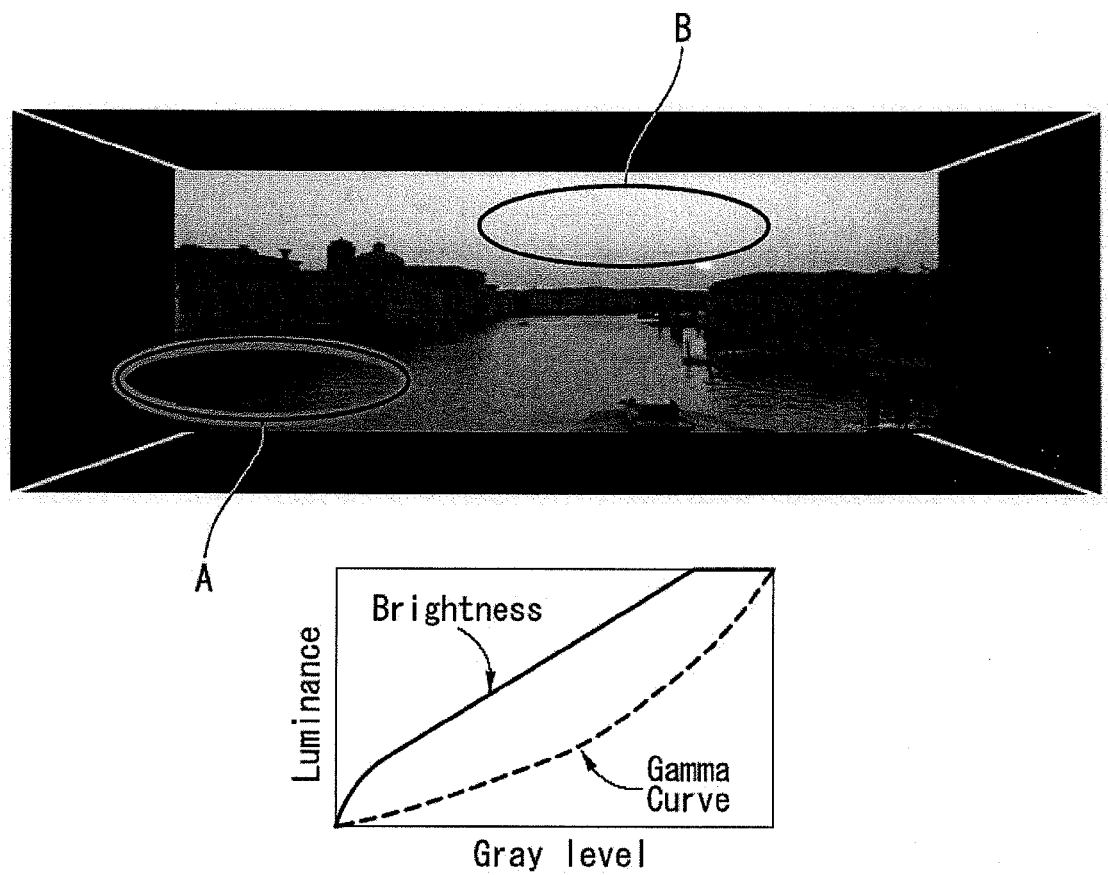
FIG. 4 illustrates an image in a relatively darker living room environment than a middle brightness.

The data mapping unit 152 selects a lookup table corresponding to the gamma curve information GCx output by the gamma curve setting unit 151 and then one-to-one maps the digital video data RGB to data registered in the selected lookup table to generate the modulation digital video data R'G'B'. Hence, even if an illuminance of external light changes, a relative brightness of an image the user perceives is uniformly kept at an original brightness level of the image due to the modulation digital video data R'G'B'. For example, the user can perceive an image as a same gray level in a living room environment shown in FIG. 11 brighter than a living room environment having a middle brightness based on a previously determined reference gamma curve and a living room environment shown in FIG. 12 darker than the middle brightness. This is because a relative brightness the user perceives is uniformly kept at an original brightness level of the image irrespective of changes in watching environment and has a good linearity in all of gray level periods by performing a gamma curve modulation using the modulation digital video data R'G'B'. Therefore, a reduction of the image quality in the specific gray level regions A and B illustrated in FIGS. 3 and 4 can be completely solved.

The storage unit 153 includes a plurality of lookup tables LUT1 to LUTn one-to-one corresponding to the gamma curve informations corresponding to the intensities of the illuminance of external light.

FIGS. 7 to 10C illustrate a second exemplary configuration of the gamma curve adjusting circuit 15. In FIGS. 7 to 10C, a better linearity of a relative brightness may be secured as compared with FIG. 6.

Figure 7:
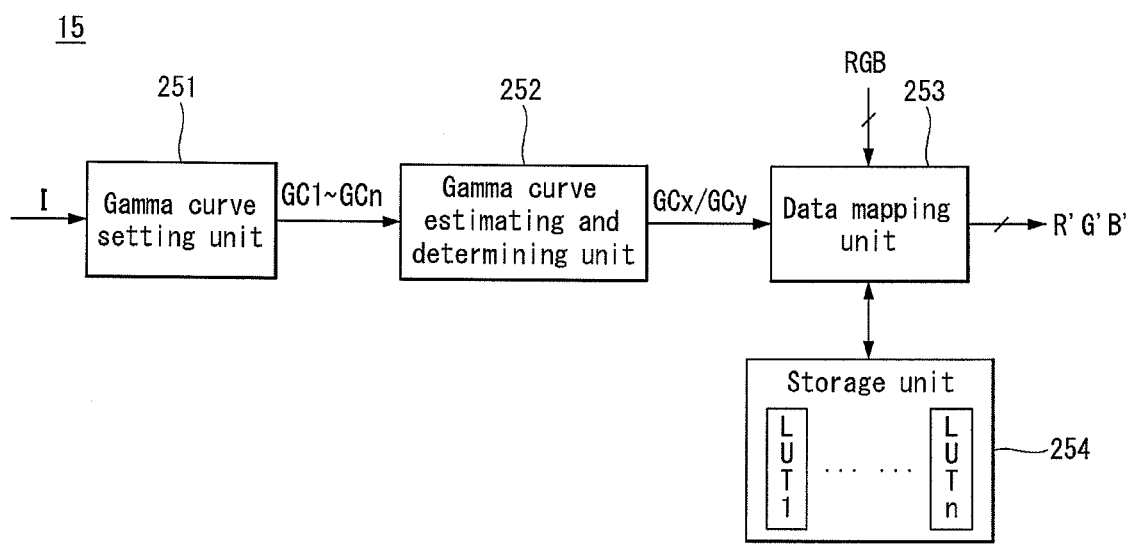
FIG. 7 illustrates a second exemplary configuration of the gamma curve adjusting circuit.

As shown in FIG. 7, the gamma curve adjusting circuit 15 includes a gamma curve setting unit 251, a gamma curve estimating and determining unit 252, a data mapping unit 253, and a storage unit 254.

The gamma curve setting unit 251 and the storage unit 254 perform substantially the same functions as the gamma curve setting unit 151 and the storage unit 153 shown in FIG. 6.

Figure 8:
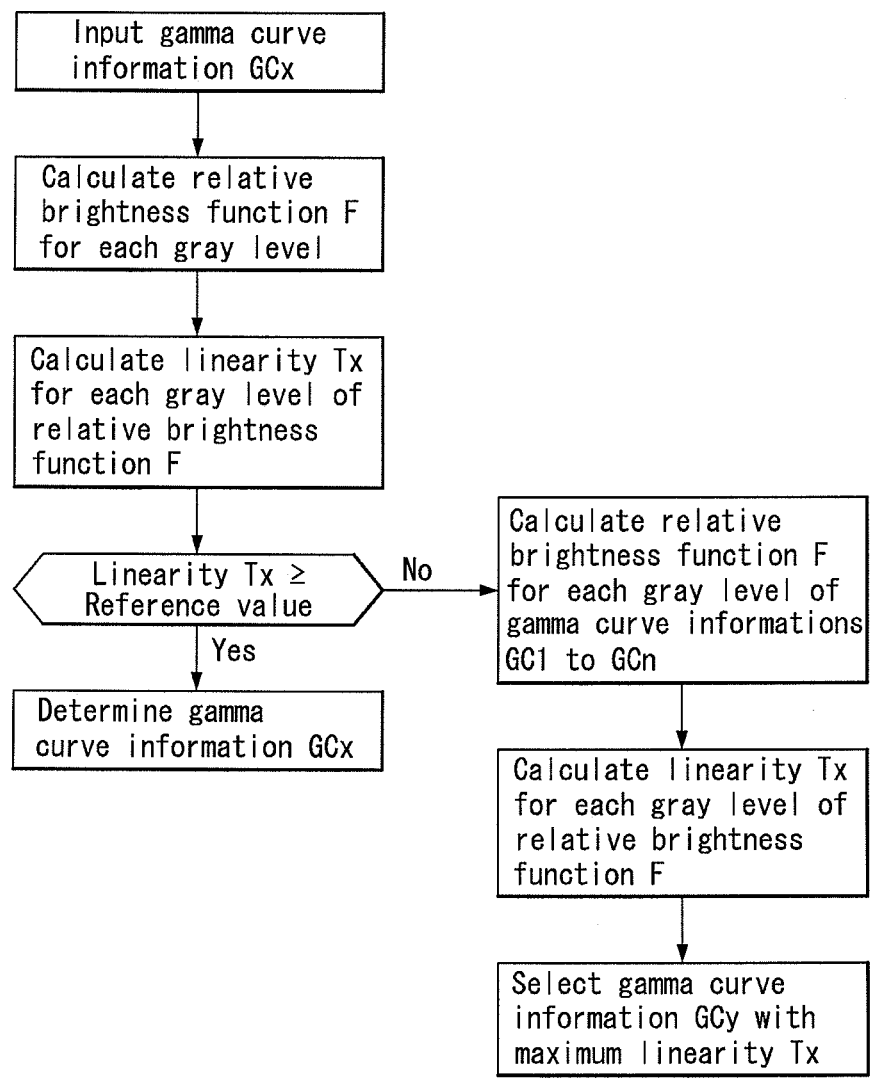
FIG. 8 illustrates an operation of a gamma curve estimating and determining unit of FIG. 7.

As shown in FIG. 8, the gamma curve estimating and determining unit 252 calculates a relative brightness function F for each gray level based on a gamma curve information GCx selected by the gamma curve setting unit 251. The relative brightness function F is defined by a relative brightness B of an image varying depending on a luminance L of input gray level as indicated in the following Equations 1 to 4. The origin of the above Equations 1 to 4 is Springer-Verlag 1980, Siemens Forsch. u. Entwickl. Ber. Bd.9(1980) Nr.6. The above Equations 1 to 4 relate to FIG. 4 of the paper. The luminance L of input gray level is affected by a reference gamma G, an illuminance I of external light, a maximum white luminance Max_L of the image, a surface reflectance R of the liquid crystal display panel 10, etc. The maximum white luminance Max_L of the image may be determined depending on a maximum gray level among gray levels of input data corresponding to one frame or depending on a minimum gray level based on a histogram analyzing result of input data corresponding to one frame.

$$B = 15.0\ L^{0.34} - 23.8\ (L \leq 10\ \text{nit}) \qquad \text{[Equation 1]}$$

$$B = 17.2\ L^{0.34} - 28.6\ (10 < L \leq 25\ \text{nit}) \qquad \text{[Equation 2]}$$

$$B = 20.2\ L^{0.34} - 34.3\ (25 < L \leq 1{,}000\ \text{nit}) \qquad \text{[Equation 3]}$$

$$B = 27\ L^{0.29} - 2.65 \qquad \text{[Equation 4]}$$

For example, when the reference gamma G, the illuminance I of external light, the maximum white luminance Max_L of the image, and the surface reflectance R of the liquid crystal display panel 10 are 2.2 gamma, 300 nit, 500 nit, and 0%, respectively, the relative brightness function F is represented by the above Equations 1 to 3. When the luminance L of input gray level is provided as indicated in the following Table 1 and FIG. 9A, the Equation 1 is applied to a luminance equal to or less than 10 nit, the Equation 2 is applied to a luminance that is greater than 10 nit and equal to or less than 25 nit, and the Equation 3 is applied to a luminance that is greater than 25 nit and equal to or less than 1,000 nit.

TABLE 1

| Input gray level | Luminance L of input gray level | Calculated relative brightness B | Adjusted relative brightness B | Adjusted luminance L |
|---|---|---|---|---|
| 0 | 0.0 | −23.8000 | 0.0000 | 3.8874 |
| 15 | 1.0 | −8.8939 | 7.8123 | 8.9588 |
| 31 | 4.8 | 1.8559 | 16.1455 | 16.6432 |
| 47 | 12.1 | 11.5620 | 24.4786 | 27.5034 |
| 63 | 23.1 | 21.4026 | 32.8118 | 34.1718 |
| 79 | 38.0 | 35.2559 | 41.1449 | 48.2139 |
| 127 | 107.9 | 64.9097 | 66.1443 | 111.8787 |
| 191 | 264.8 | 100.3239 | 99.4769 | 259.8925 |
| 255 | 500.0 | 132.8095 | 132.8095 | 500.0000 |

The relative brightness B for each gray level calculated through the Equations 1 to 3 is −23.8000 to 132.8095 as indicated in the above Table 1.

Figure 10A:
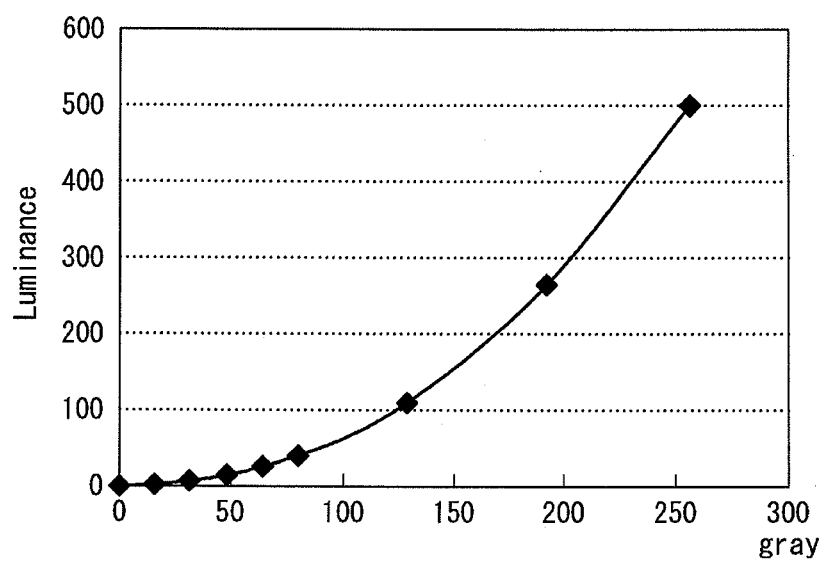
FIGS. 10A to 10C are graphs related to Table 2.

As another example, when the reference gamma G, the illuminance I of external light, the maximum white luminance Max_L of the image, and the surface reflectance R of the liquid crystal display panel 10 are 2.2 gamma, 0 nit, 500 nit, and 0%, respectively and the luminance L of input gray level is provided as indicated in the following Table 2 and FIG. 10A, the relative brightness function F is represented by the above Equation 4.

TABLE 2

| Input gray level | Luminance L of input gray level | Calculated relative brightness B | Adjusted relative brightness B | Adjusted luminance L |
|---|---|---|---|---|
| 0 | 0.0 | −2.6500 | 0.0000 | 0.0003 |
| 15 | 1.0 | 24.2058 | 9.4739 | 0.0632 |

TABLE 2-continued

| Input gray level | Luminance L of input gray level | Calculated relative brightness B | Adjusted relative brightness B | Adjusted luminance L |
|---|---|---|---|---|
| 31  | 4.8   | 40.0258  | 19.5794  | 0.5115   |
| 47  | 12.1  | 53.0033  | 29.6849  | 1.8622   |
| 63  | 23.1  | 64.4421  | 39.7903  | 4.7566   |
| 79  | 38.0  | 74.8637  | 49.8958  | 9.9347   |
| 127 | 107.9 | 102.2847 | 80.2123  | 47.7845  |
| 191 | 264.8 | 133.4919 | 120.6342 | 188.0567 |
| 255 | 500.0 | 161.0562 | 161.0562 | 500.0000 |

The relative brightness B for each gray level calculated through the Equation 4 is −2.6500 to 161.0562 as indicated in the above Table 2.

Figure 9A:
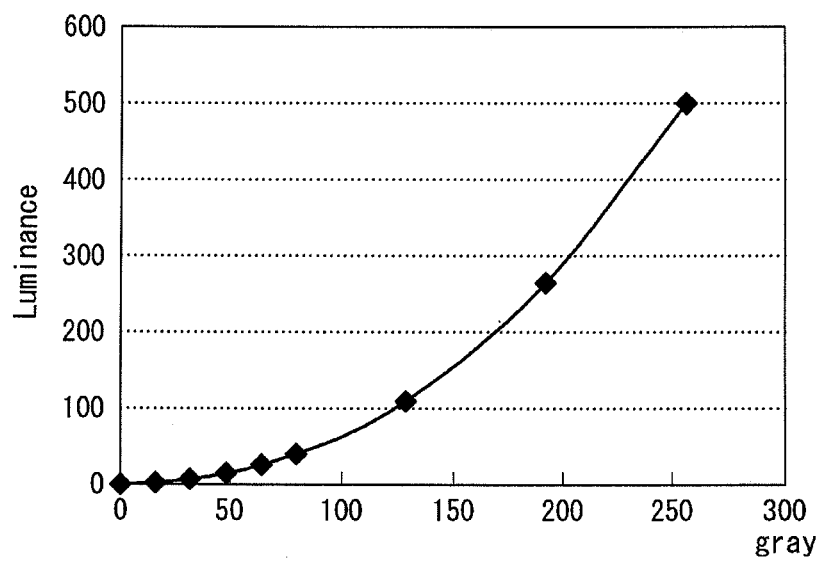
FIGS. 9A to 9C are graphs related to Table 1.
Figure 9B:
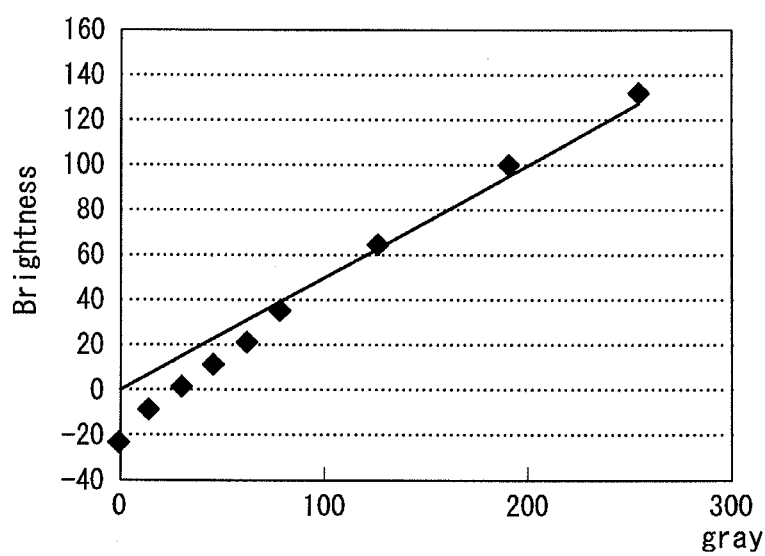
Figure 9C:
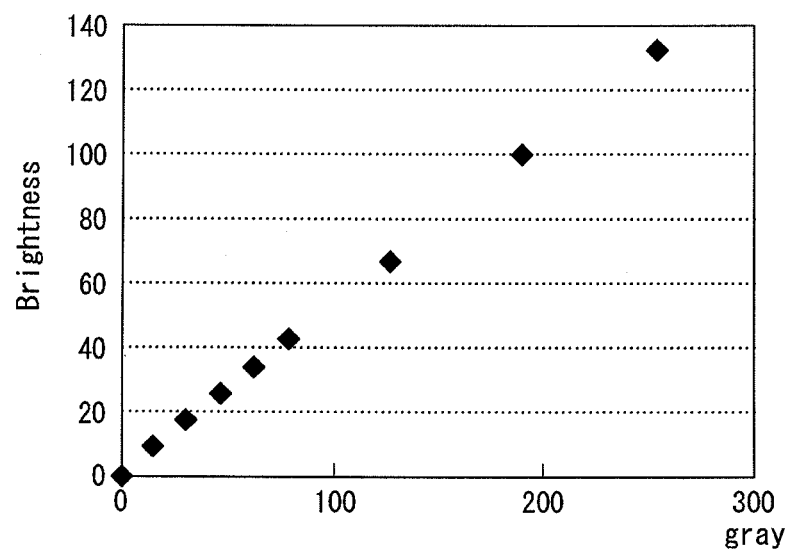
Figure 10B:
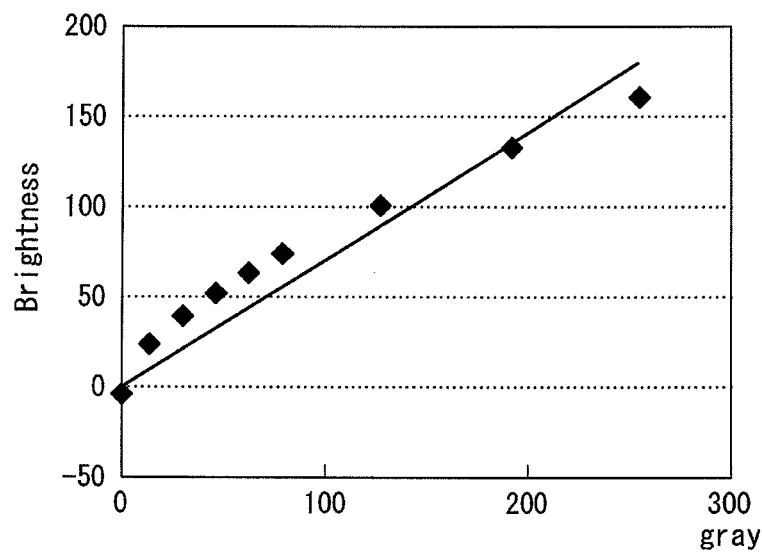
Figure 10C:
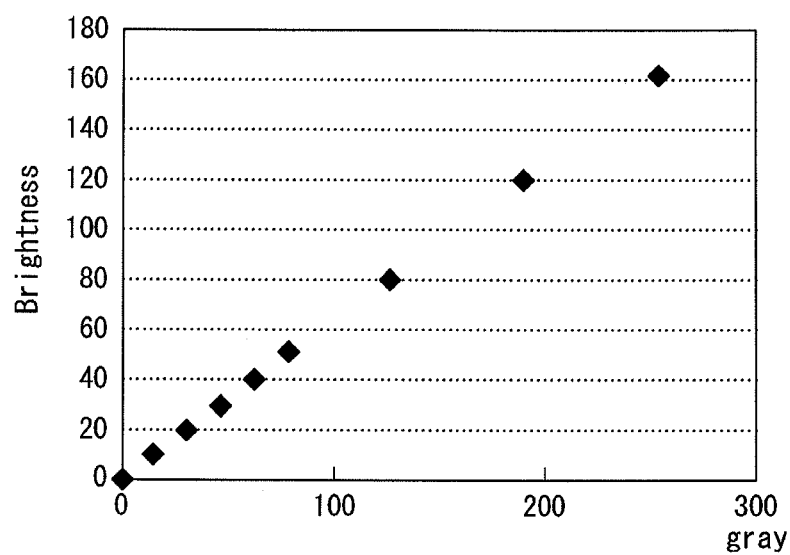
Figure 11:
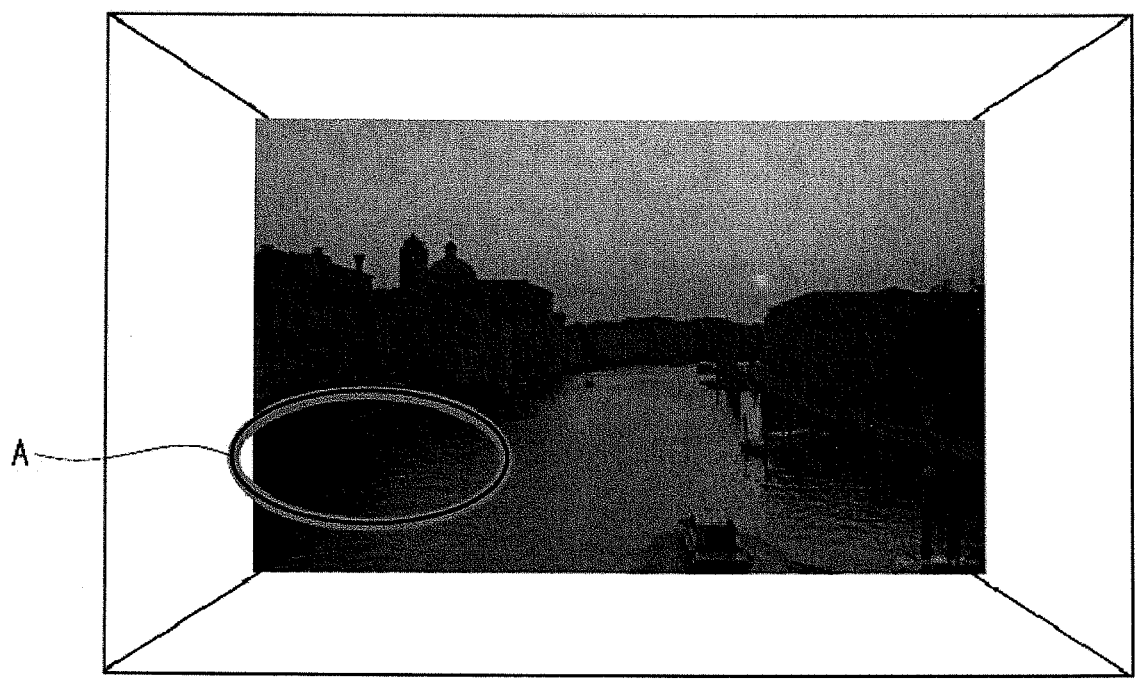
FIG. 11 illustrates a linearity of a relative brightness, that a user perceives in a relatively brighter living room environment than a middle brightness, in all of gray level periods.
Figure 11:
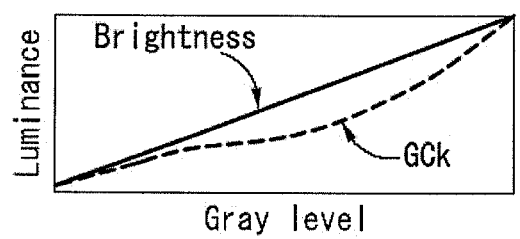
Figure 12:
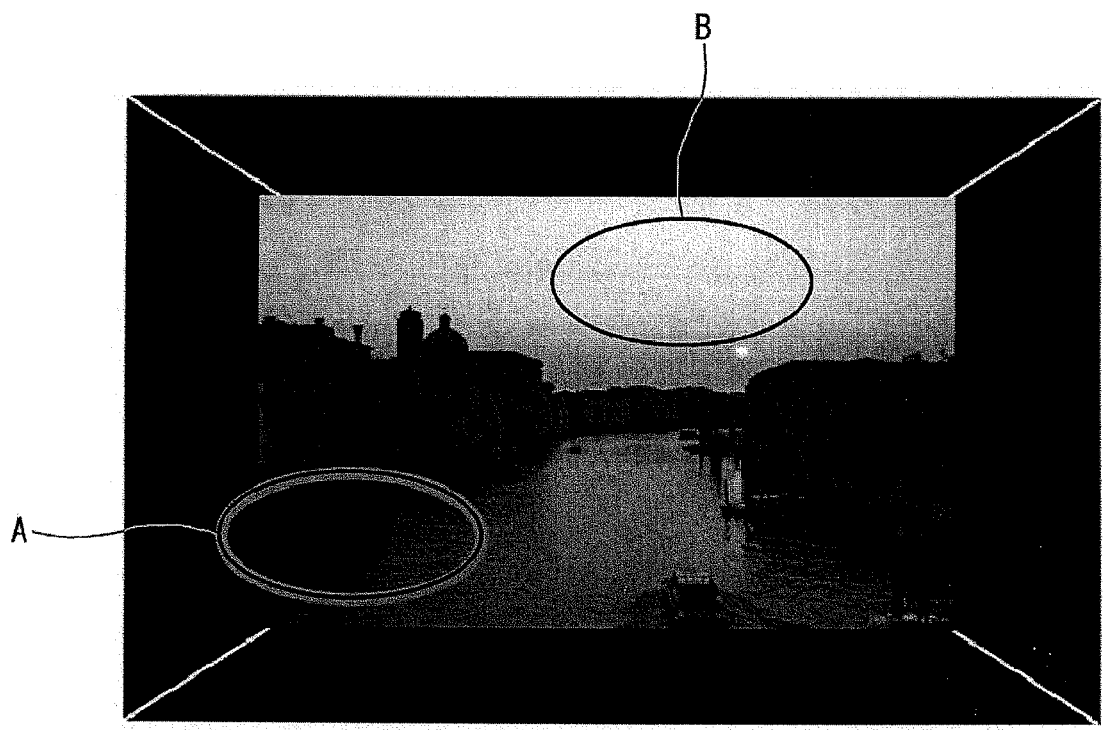
FIG. 12 illustrates a linearity of a relative brightness, that a user perceives in a relatively darker living room environment than a middle brightness, in all of gray level periods.
Figure 12:
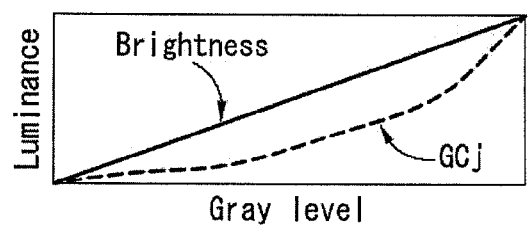

After the calculation of the relative brightness function F for each gray level is completed, the gamma curve estimating and determining unit 252 calculates a linearity Tx of the relative brightnesses B calculated through the relative brightness function F as indicated in FIGS. 9B and 10B. The gamma curve estimating and determining unit 252 compares the linearity Tx of the relative brightnesses B with a previously determined reference value and outputs the selected gamma curve information GCx without modulation if the linearity Tx is equal to or greater than the previously determined reference value. The reference value is a critical value for determining whether or not a relative brightness the user perceives has a good linearity in all of gray level periods irrespective of changes in an illuminance of external light. If the linearity Tx is smaller than the reference value, the gamma curve estimating and determining unit 252 calculates a relative brightness function F for each gray level of each of gamma curve informations GC1 to GCn. Then, the gamma curve estimating and determining unit 252 calculates a linearity Tx of relative brightnesses B calculated through the calculated relative brightness function F and selects a gamma curve information GCy with a maximum linearity Tx to output the gamma curve information GCy. The relative brightnesses B may adjusted to 0.0000 to 161.0562, for example, based on the gamma curve information GCy as indicated in Table 1 and FIG. 9C, or may adjusted to 0.0000 to 132.8095, for example, based on the gamma curve information GCy as indicated in Table 2 and FIG. 10C.

The data mapping unit 253 selects a lookup table corresponding to the gamma curve information GCx or GCy output by the gamma curve estimating and determining unit 252 and then one-to-one maps the digital video data RGB to data registered in the selected lookup table to generate the modulation digital video data R'G'B'. Hence, even if an illuminance of external light changes, a relative brightness of an image the user perceives is uniformly kept at an original brightness level of the image due to the modulation digital video data R'G'B'. For example, for an image, the user can perceive a same gray level in the brighter living room environment shown in FIG. 11 than the middle brightness and in the darker living room environment shown in FIG. 12 than the middle brightness as the gray level in a general living room environment of a middle brightness. In other words, the gray levels of a same image in the brighter living room environment than the middle brightness, in the general living room environment of a middle brightness and in the darker living room environment than the middle brightness may be actually different from each other, while the perceived gray levels of the same image in those environment are the same. This is because a relative brightness of an image the user perceives is uniformly kept at an original brightness level of the image irrespective of changes in watching environment and has a good linearity in all of gray level periods by performing a gamma curve modulation using the modulation digital video data R'G'B'. Therefore, a reduction of the image quality in the specific gray level regions A and B illustrated in FIGS. 3 and 4 can be completely solved.

FIGS. 13 to 16C illustrate a third exemplary configuration of the gamma curve adjusting circuit 15. In FIGS. 13 to 16C, a gamma curve may be changed in real-time without a lookup table, so that a better linearity of a relative brightness is secured as compared with FIGS. 6 to 10C.

Figure 13:
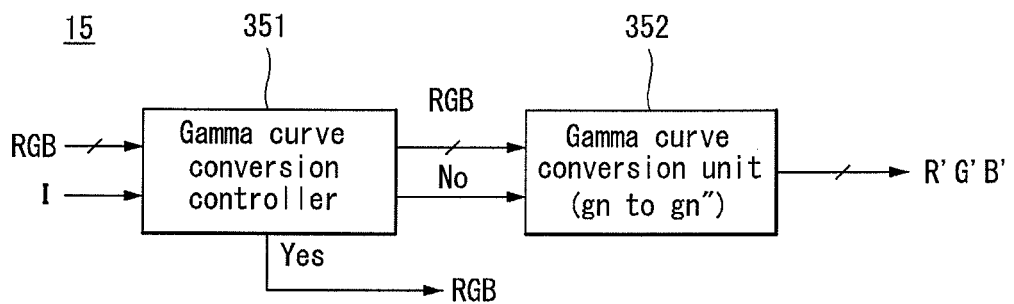
FIG. 13 illustrates a third exemplary configuration of the gamma curve adjusting circuit.

As shown in FIG. 13, the gamma curve adjusting circuit 15 includes a gamma curve conversion controller 351 and a gamma curve conversion unit 352.

Figure 14:
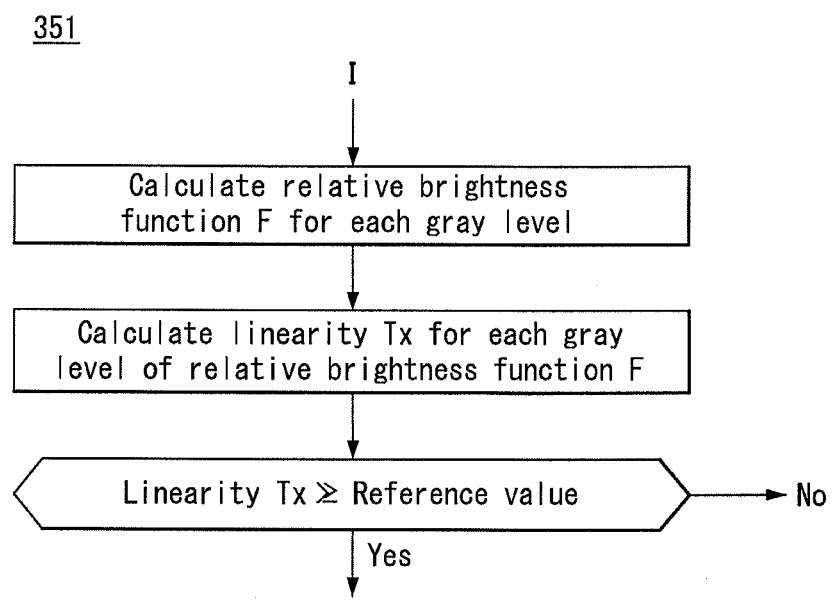
FIG. 14 illustrates an operation of a gamma curve conversion controller.

As shown in FIG. 14, the gamma curve conversion controller 351 calculates a relative brightness function F for each gray level corresponding to the illuminance I of external light received from the external light sensing unit 14 based on a previously determined gamma curve. The relative brightness function F is defined by a relative brightness B of an image varying depending on a luminance L of input gray level as indicated in the above Equations 1 to 4. The luminance L of input gray level is affected by a reference gamma G, an illuminance I of external light, a maximum white luminance Max_L of the image, a surface reflectance R of the liquid crystal display panel 10, etc. The maximum white luminance Max_L of the image may be determined depending on a maximum gray level among gray levels of input data corresponding to one frame or depending on a minimum gray level based on a histogram analyzing result of input data corresponding to one frame. After the calculation of the relative brightness function F for each gray level is completed, the gamma curve conversion controller 351 calculates a linearity Tx of relative brightnesses calculated through the relative brightness function F. The gamma curve conversion controller 351 compares the linearity Tx with a previously determined reference value and outputs the digital video data RGB without the modulation if the linearity Tx is equal to or greater than the previously determined reference value. If the linearity Tx is smaller than the previously determined reference value, the gamma curve conversion controller 351 generates an operation signal NO indicating an operation of the gamma curve conversion unit 352. The reference value is a critical value for determining whether or not a relative brightness the user perceives has a good linearity in all of gray level periods irrespective of changes in an illuminance of external light.

Figure 15:
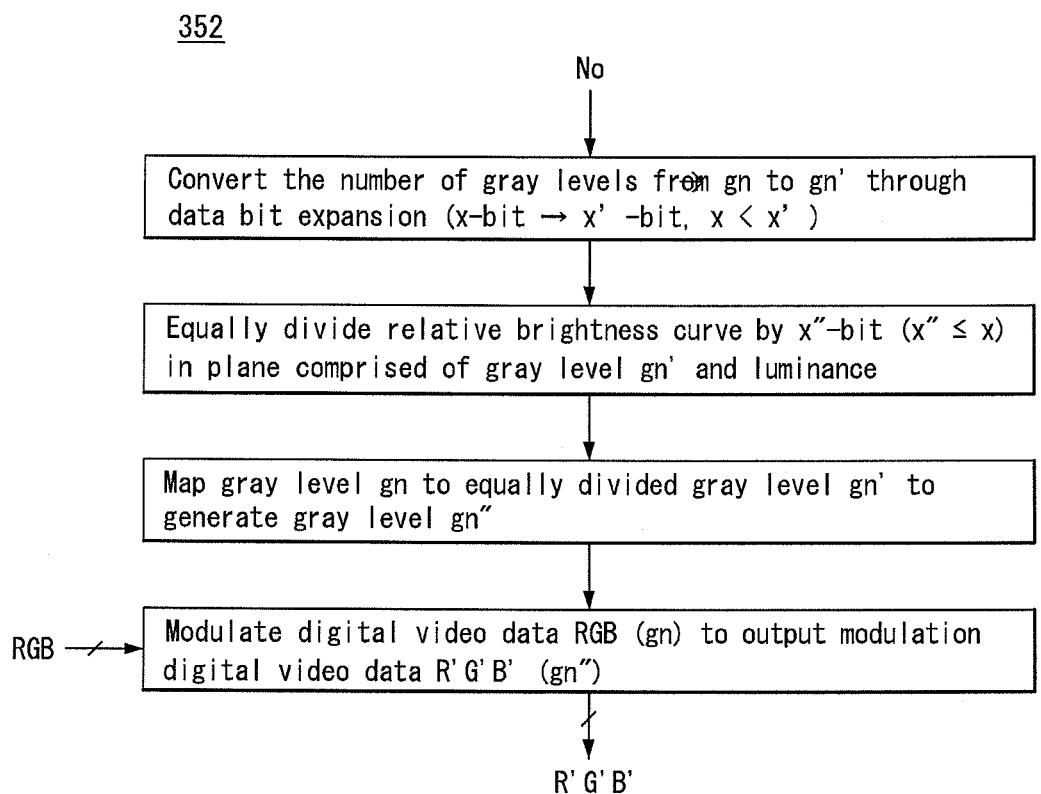
FIG. 15 illustrates an operation of a gamma curve conversion unit.
Figure 16A:
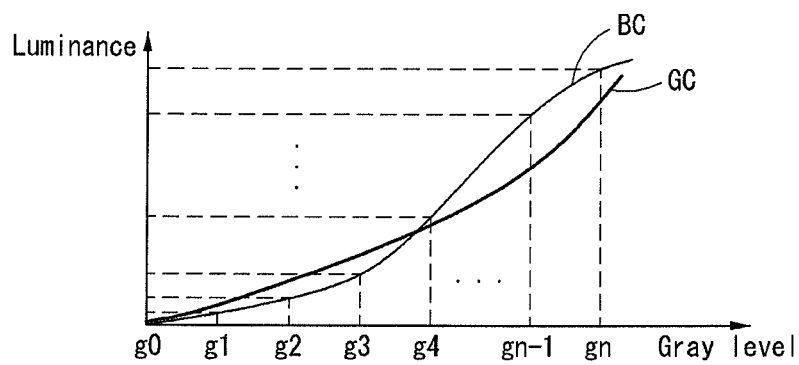
FIGS. 16A to 16C illustrate graphs showing operations of a gamma curve conversion unit.
Figure 16B:
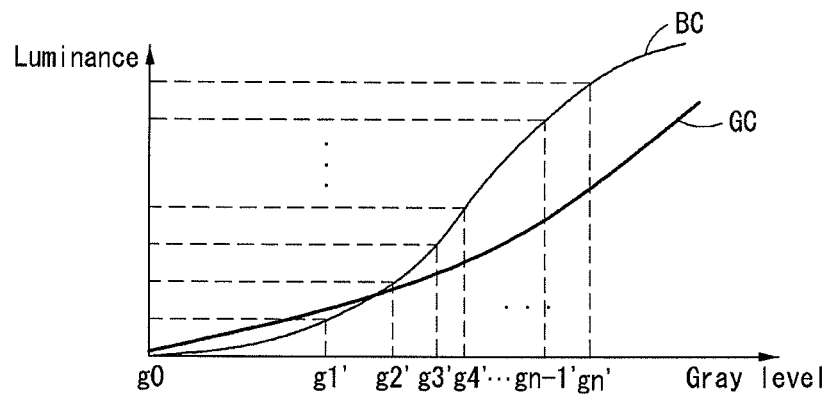
Figure 16C:
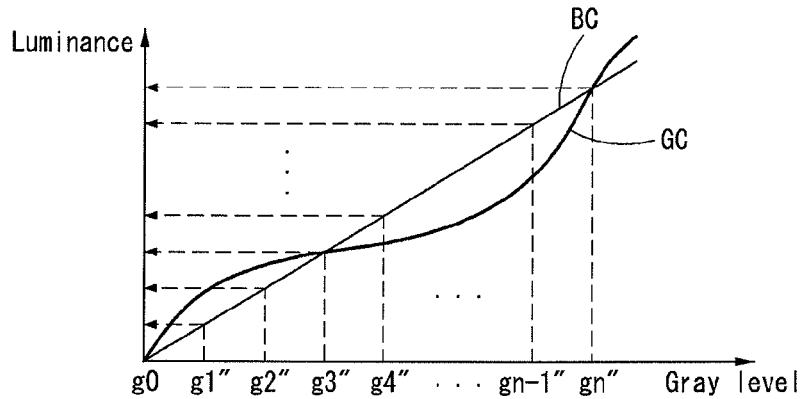

As shown in FIG. 15, the gamma curve conversion unit 352 converts the number of gray levels from g0 to gn to g0 to gn' (refer to FIGS. 16A and 16B) through data bit expansion (data bit expansion from x-bit to x'-bit, x<x') in response to the operation signal NO generated by the gamma curve conversion controller 351. For example, if 8-bit data is expanded into 10-bit data, the number of gray levels changes from 256 to 1024. Subsequently, the gamma curve conversion unit 352 equally divides a relative brightness curve BC in a plane comprised of the gray levels g0 to gn' and a luminance by x"-bit (x"≦x). For example, the relative brightness curve BC is equally divided by 8-bit. Subsequently, the gamma curve conversion unit 352 maps the gray levels g0 to gn to the equally divided gray levels g0 to gn' to generate gray levels g0 to gn" (refer to FIG. 16C). Subsequently, the gamma curve conversion unit 352 modulates the digital video data RGB in conformity with the gray levels g0 to gn" to output the modulation digital video data R'G'B'. Hence, even if an illuminance of external light changes, a relative brightness of an image the user perceives is uniformly kept at an original brightness level of the image due to the modulation digital video data R'G'B'. Namely, as shown in FIG. 16C, the relative brightness curve BC has a good linearity in all of gray level periods by changing the gamma curve GC through the modulation of the digital video data RGB in conformity with the gray levels g0 to gn" generated according to the illuminance I of external light. Therefore, a reduction of the image quality in the specific gray level regions A and B illustrated in FIGS. 3 and 4 can be solved.

Figure 17:
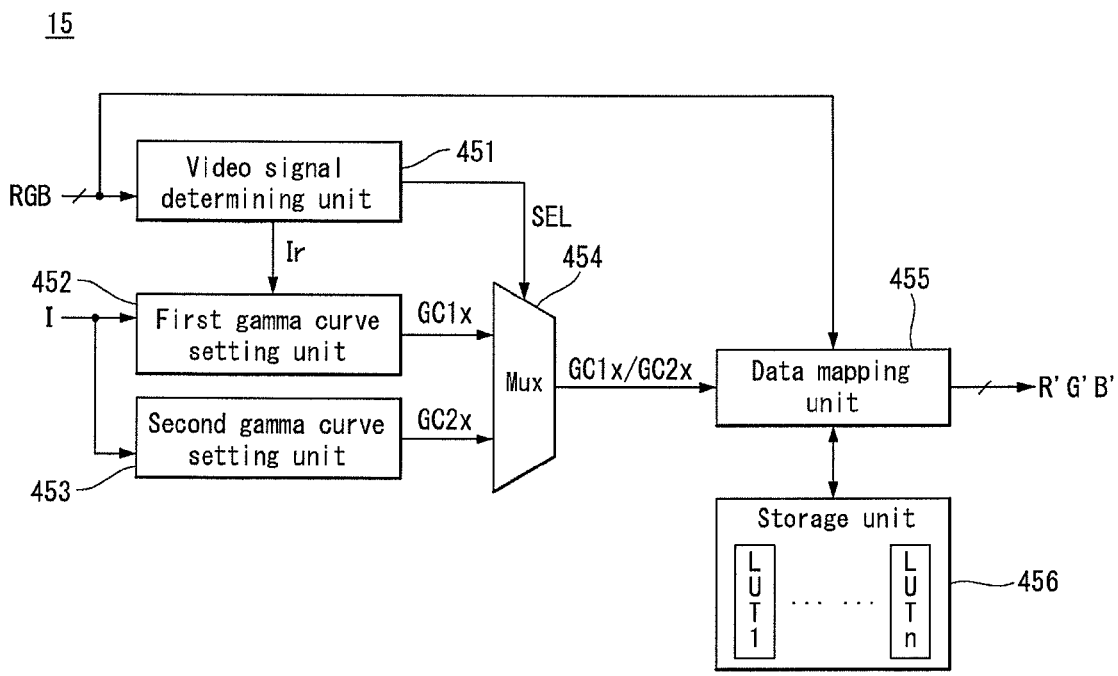
FIG. 17 illustrates a fourth exemplary configuration of the gamma curve adjusting circuit.

FIG. 17 illustrates a fourth exemplary configuration of the gamma curve adjusting circuit 15. In FIG. 17, because an input image may be displayed without changes in the input image irrespective of changes in watching environment as compared with FIG. 6, a display accuracy of the input image may be improved.

As shown in FIG. 17, the gamma curve adjusting circuit 15 includes a video signal determining unit 451, a first gamma curve setting unit 452, a second gamma curve setting unit 453, a multiplexer (MUX) 454, a data mapping unit 455, and a storage unit 456. The storage unit 456 performs the substantially same functions as the storage unit 153 shown in FIG. 6.

The video signal determining unit 451 determines whether or not the digital video data RGB includes an illuminance information Ir of external light and generates a selection signal SEL. More specifically, when the digital video data RGB includes the illuminance information Ir of external light, the video signal determining unit 451 generates a selection signal SEL of a first logic level and extracts the illuminance information Ir of external light to supply the extracted information to the first gamma curve setting unit 452. When the digital video data RGB does not include the illuminance information Ir of external light, the video signal determining unit 451 generates a selection signal SEL of a second logic level. The illuminance information Ir of external light may be generally assigned to a data packet of the digital video data RGB with several bits.

The first gamma curve setting unit 452 sets gamma curve information corresponding to each intensity of the illuminance information Ir of external light. The first gamma curve setting unit 452 selects a gamma curve information GCx1 corresponding to the illuminance information Ir of external supplied by the video signal determining unit 451 to output the gamma curve information GCx1 within a range including the illuminance I of external light.

The second gamma curve setting unit 453 selects a gamma curve information GC2x corresponding to the illuminance I of external light received from the external light sensing unit 14 among gamma curve information of each intensity of a previously determined illuminance of external light to output the gamma curve information GC2x. The second gamma curve setting unit 453 performs the substantially same functions as the gamma curve setting unit 151 shown in FIG. 6.

The multiplexer 454 selectively outputs the gamma curve information GC1x and GC2x in response to the selection signal SEL received from the video signal determining unit 451. More specifically, the multiplexer 454 outputs the gamma curve information GC1x in response to the selection signal SEL of the first logic level and outputs the gamma curve information GC2x in response to the selection signal SEL of the second logic level.

The data mapping unit 455 selects a lookup table corresponding to the gamma curve information GC1x/GC2x output by the multiplexer 454 and then one-to-one maps the digital video data RGB to data registered in the selected lookup table to generate the modulation digital video data R'G'B'. Hence, even if an illuminance of external light changes, a relative brightness of an image the user perceives is uniformly kept at an original brightness level of the image due to the modulation digital video data R'G'B'.

Figure 18:
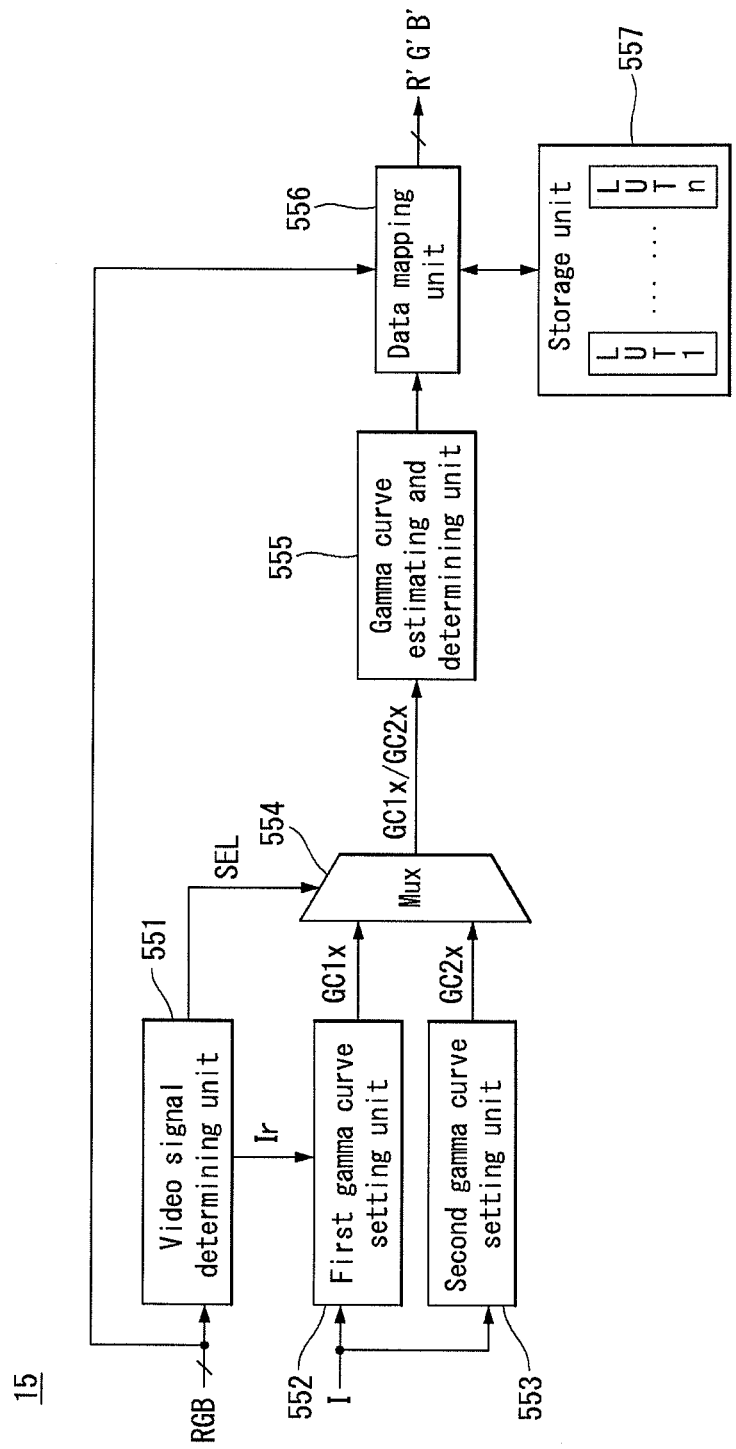
FIG. 18 illustrates a fifth exemplary configuration of the gamma curve adjusting circuit.
Figure 19:
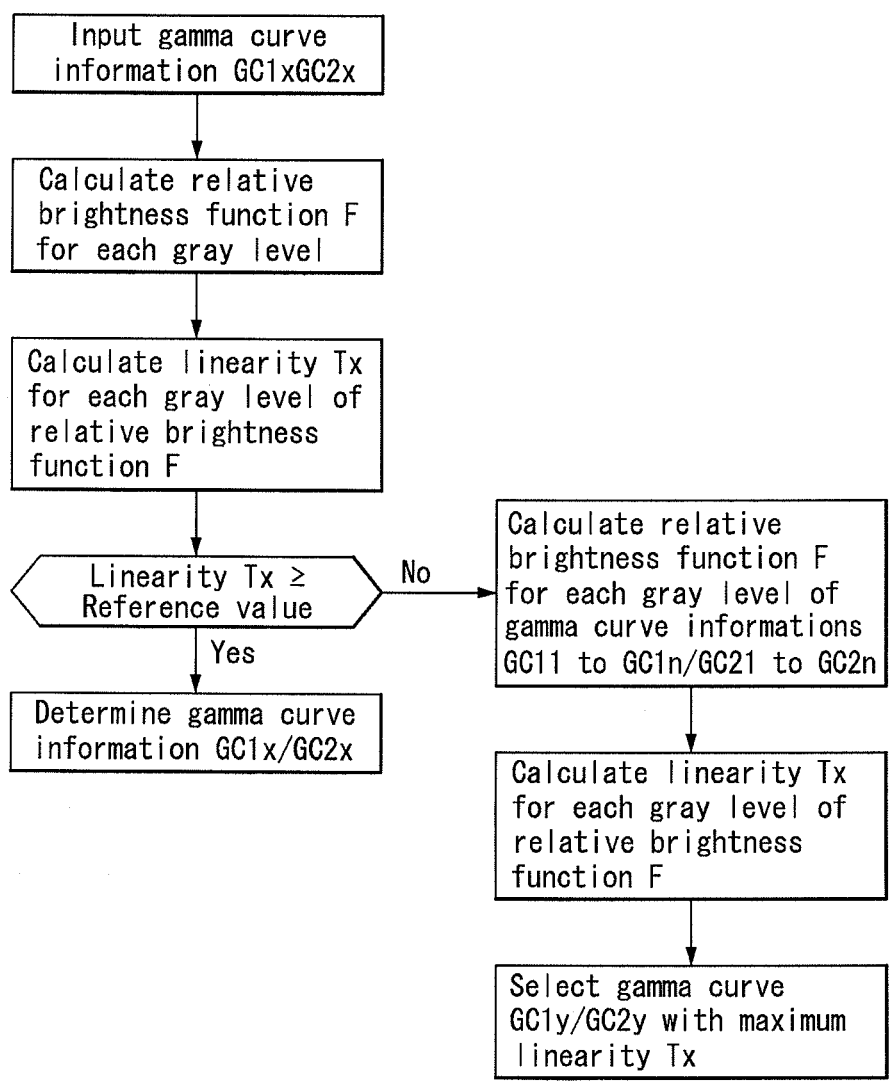
FIG. 19 illustrates an operation of a gamma curve estimating and determining unit.

FIGS. 18 and 19 illustrate a fifth exemplary configuration of the gamma curve adjusting circuit 15. In FIGS. 18 and 19, because an input image may be displayed without changes in the input image irrespective of changes in watching environment as compared with FIGS. 7 to 10C, a display accuracy of the input image may be improved.

As shown in FIG. 18, the gamma curve adjusting circuit 15 includes a video signal determining unit 551, a first gamma curve setting unit 552, a second gamma curve setting unit 553, a multiplexer (MUX) 554, a gamma curve estimating and determining unit 555, a data mapping unit 556, and a storage unit 557.

The video signal determining unit 551, the first gamma curve setting unit 552, the second gamma curve setting unit 553, the multiplexer 554, and the storage unit 557 perform the substantially same functions as the video signal determining unit 451, the first gamma curve setting unit 452, the second gamma curve setting unit 453, the multiplexer 454, and the storage unit 456 shown in FIG. 17.

As shown in FIG. 19, the gamma curve estimating and determining unit 555 calculates a relative brightness function F for each gray level based on a gamma curve information GC1x/GC2x received from the multiplexer 554. The relative brightness function F is defined by a relative brightness B of an image varying depending on a luminance L of input gray level as indicated in the above Equations 1 to 4. The luminance L of input gray level is affected by a reference gamma G, an illuminance I of external light, a maximum white luminance Max_L of the image, a surface reflectance R of the liquid crystal display panel 10, etc. The maximum white luminance Max_L of the image may be determined depending on a maximum gray level among gray levels of input data corresponding to one frame or depending on a minimum gray level based on a histogram analyzing result of input data corresponding to one frame. After the calculation of the relative brightness function F for each gray level is completed, the gamma curve estimating and determining unit 555 calculates a linearity Tx of relative brightnesses B calculated through the relative brightness function F. The gamma curve estimating and determining unit 555 compares the linearity Tx with a previously determined reference value and outputs the selected gamma curve information GCx1/GCx2 without modulation if the linearity Tx is equal to or greater than the previously determined reference value. The reference value is a critical value for determining whether or not a relative brightness the user perceives has a good linearity in all of gray level periods irrespective of changes in the illuminance of external light. If the linearity Tx is smaller than the reference value, the gamma curve estimating and determining unit 555 calculates the relative brightness function F for each gray level of each of all of gamma curve informations GC11 to GC1n/GC21 to GC2n. The gamma curve estimating and determining unit 555 calculates linearity Tx of relative brightnesses B calculated through the calculated relative brightness function F and selects gamma curve information GC1y/GC2y with a maximum linearity Tx to output the gamma curve information GC1y/GC2y.

The data mapping unit 556 selects a lookup table corresponding to the gamma curve information GC1x/GC2x/GC1y/GC2y output by the gamma curve estimating and determining unit 555 and then one-to-one maps the digital video data RGB to data registered in the selected lookup table to generate the modulation digital video data R'G'B'. Hence, even if an illuminance of external light changes, a relative brightness of an image the user perceives is uniformly kept at an original brightness level of the image due to the modulation digital video data R'G'B'.

Figure 20A:
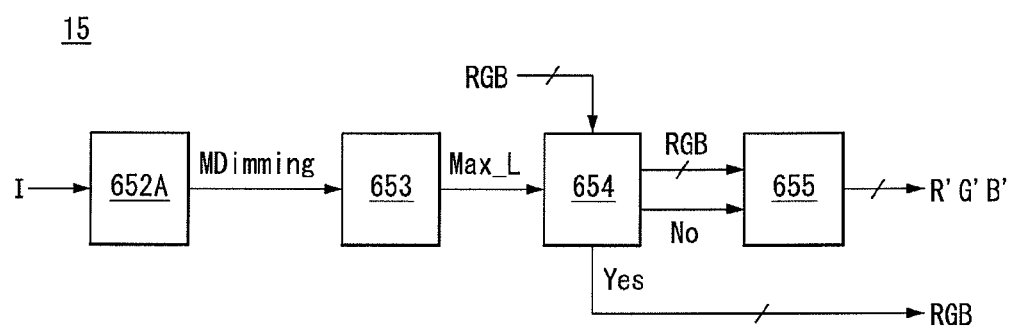
FIGS. 20A to 20C illustrate a sixth exemplary configuration of the gamma curve adjusting circuit.
Figure 20B:
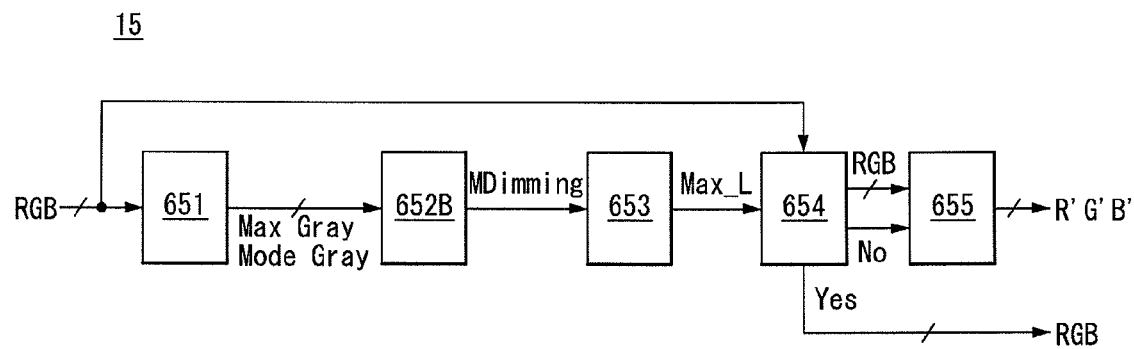
Figure 20C:
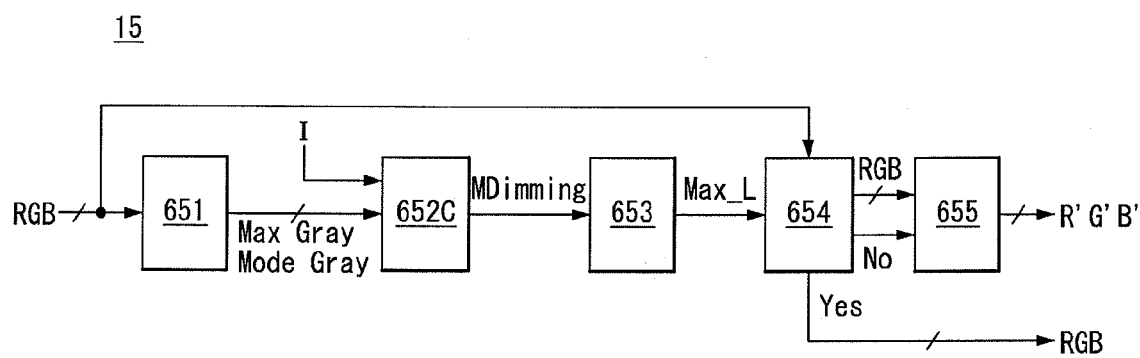

FIGS. 20A to 20C illustrate a sixth exemplary configuration of the gamma curve adjusting circuit 15. More specifically, FIGS. 20A to 20C illustrate a modulation of the digital video data RGB based on an adjustment dimming signal according to the illuminance I of external light or an input image, unlike FIGS. 6 to 18 illustrating a modulation of the digital video data RGB based on the illuminance I of external light.

As shown in FIG. 20A, the gamma curve adjusting circuit 15 includes a dimming ratio adjusting unit 652A, a maximum luminance calculating unit 653, a gamma curve conversion controller 654, and a gamma curve converting unit 655.

The dimming ratio adjusting unit 652A generates an adjustment dimming signal MDimming based on the illuminance I of external light received from the external light sensing unit 14. The adjustment dimming signal MDimming is supplied to the inverter 16 and is used to control a luminance of the backlight unit 17.

The maximum luminance calculating unit 653 calculates a maximum white luminance Max_L of an input image according to the adjustment dimming signal MDimming.

The gamma curve conversion controller 654 calculates a relative brightness function F for each gray level corresponding to the maximum white luminance Max_L of the input image received from the maximum luminance calculating unit 653 based on a previously determined reference gamma curve. The relative brightness function F is defined by a relative brightness B of an image varying depending on a luminance L of input gray level as indicated in the above Equations 1 to 4. The luminance L of input gray level is affected by a reference gamma G, an illuminance I of external light, the maximum white luminance Max_L of the image, a surface reflectance R of the liquid crystal display panel 10, etc. After the calculation of the relative brightness function F for each gray level is completed, the gamma curve conversion controller 654 calculates a linearity Tx of relative brightnesses B calculated through the relative brightness function F. The gamma curve conversion controller 654 compares the linearity Tx with a previously determined reference value and outputs the digital video data RGB without modulation if the linearity Tx is equal to or greater than the previously determined reference value. If the linearity Tx is smaller than the previously determined reference value, the gamma curve conversion controller 654 generates an operation signal NO indicating an operation of the gamma curve converting unit 655.

The gamma curve converting unit 655 converts the number of gray levels from g0 to gn to g0 to gn' through data bit expansion (data bit expansion from x-bit to x'-bit, x<x') in response to the operation signal NO generated by the gamma curve conversion controller 654. Subsequently, the gamma curve converting unit 655 equally divides a relative brightness curve BC in a plane comprised of the gray levels g0 to gn' and a luminance by x"-bit (x"≦x). Subsequently, the gamma curve converting unit 655 maps the gray levels g0 to gn to the equally divided gray levels g0 to gn' to generate gray levels g0 to gn". Subsequently, the gamma curve converting unit 655 modulates the digital video data RGB in conformity with the gray levels g0 to gn" to output the modulation digital video data R'G'B'. Hence, even if an illuminance of external light changes, a relative brightness of an image the user perceives is uniformly kept at an original brightness level of the image due to the modulation digital video data R'G'B'.

As shown in FIG. 20B, the gamma curve adjusting circuit 15 includes a video signal analyzing unit 651, a dimming ratio adjusting unit 652B, a maximum luminance calculating unit 653, a gamma curve conversion controller 654, and a gamma curve converting unit 655.

The video signal analyzing unit 651 analyzes input data corresponding to one frame to extract a maximum gray level Max Gray or analyzes a histogram of input data corresponding to one frame to extract a minimum gray level Mode Gray.

The dimming ratio adjusting unit 652B generates an adjustment dimming signal MDimming based on the maximum gray level Max Gray or the minimum gray level Mode Gray extracted by the video signal analyzing unit 651.

Since configurations of the maximum luminance calculating unit 653, the gamma curve conversion controller 654, and the gamma curve converting unit 655 in FIG. 20B are substantially the same as those shown in FIG. 20A, a further description may be briefly made or may be entirely omitted.

As shown in FIG. 20C, the gamma curve adjusting circuit 15 includes a video signal analyzing unit 651, a dimming ratio adjusting unit 652C, a maximum luminance calculating unit 653, a gamma curve conversion controller 654, and a gamma curve converting unit 655.

The video signal analyzing unit 651 analyzes input data corresponding to one frame to extract a maximum gray level Max Gray or analyzes a histogram of input data corresponding to one frame to extract a minimum gray level Mode Gray.

The dimming ratio adjusting unit 652C generates an adjustment dimming signal MDimming based on the maximum gray level Max Gray or the minimum gray level Mode Gray extracted by the video signal analyzing unit 651 and based on the luminance I of external light received from the external light sensing unit 14.

Since configurations of the maximum luminance calculating unit 653, the gamma curve conversion controller 654, and the gamma curve converting unit 655 in FIG. 20C are substantially the same as those shown in FIG. 20A, a further description may be briefly made or may be entirely omitted.

FIGS. 21 to 26 illustrate a liquid crystal display and a method of driving the same capable of uniformly keeping a relative brightness of an image a user perceives at an original brightness level of the image through for example, an variation of resistances of variable resistors constituting a gamma resistor string, irrespective of changes in watching environment.

Figure 21:
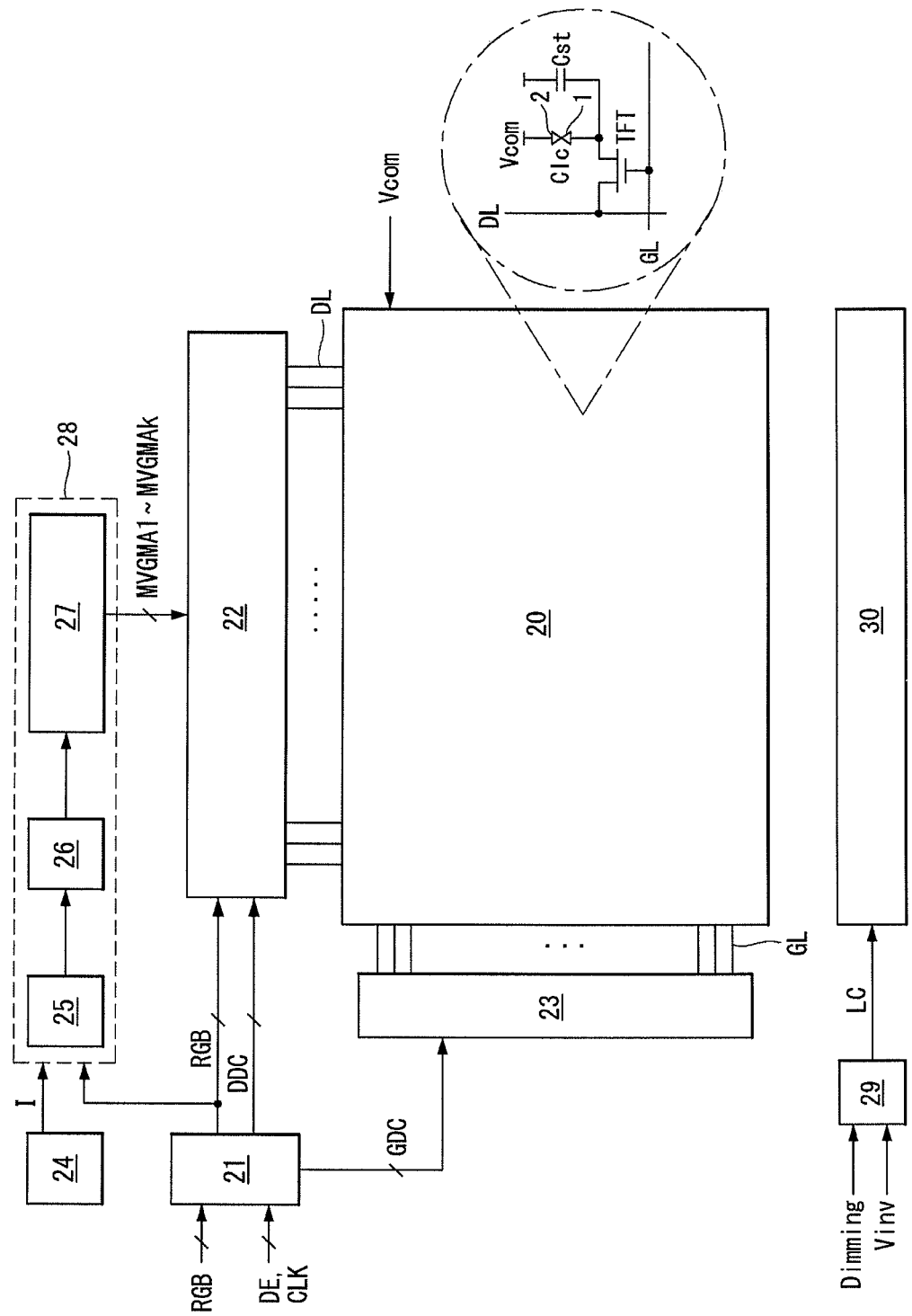
FIG. 21 is a block diagram of a liquid crystal display according to a second exemplary embodiment of the disclosure.

As shown in FIG. 21, a liquid crystal display according to a second exemplary embodiment of the disclosure includes a liquid crystal display panel 20, a timing controller 21, a data drive circuit 22, a gate drive circuit 23, an external light sensing unit 24, a gamma curve adjusting circuit 28, an inverter 29, and a backlight unit 30. Since configurations of the liquid crystal display panel 20, the timing controller 21, the gate drive circuit 23, the external light sensing unit 24, the inverter 29, and the backlight unit 30 are substantially the same as the liquid crystal display panel 10, the timing controller 11, the gate drive circuit 13, the external light sensing unit 14, the inverter 16, and the backlight unit 17 shown in FIG. 5, a further description may be briefly made or may be entirely omitted.

The data drive circuit 22 converts digital video data RGB into an analog gamma compensation voltage based on adjustment gamma reference voltages MVGMA1 to MVGMAk received from the gamma curve adjusting circuit 28 in response to a data timing control signal DDC received from the timing controller 21 to supply the analog gamma compensation voltage as a data voltage to data lines DL of the liquid crystal display panel 20. Since a detailed configuration of the data drive circuit 22 is substantially the same as the data drive circuit 12 shown in FIG. 5, a further description may be briefly made or may be entirely omitted.

The gamma curve adjusting circuit 28 varies resistances of variable resistors constituting a gamma resistor string based on an illuminance I of external light or based on an adjustment dimming signal according to the illuminance I of external light or an input image to modulate a gamma curve, so that a relative brightness of an image a user perceives is uniformly kept irrespective of changes in watching environment. Hence, the relative brightness of the image the user perceives is uniformly kept at an original brightness level of the image irrespective of changes in watching environment and has a good linearity in all of gray level periods due to the modulation of the gamma curve. For the above-described operation, the gamma curve adjusting circuit 28 includes a gamma curve setting unit 25, a gamma resistance setting unit 26, and a gamma reference voltage conversion unit 27.

The gamma curve setting unit 25 may have one of a configuration of the gamma curve setting unit 151 shown in FIG. 6, a configuration comprised of the gamma curve setting unit 251 and the gamma curve estimating and determining unit 252 shown in FIG. 7, a configuration comprised of the video signal determining unit 451, the first and second gamma curve setting units 452 and 453, and the multiplexer 454 shown in FIG. 17, and a configuration comprised of the video signal determining unit 551, the first and second gamma curve setting units 552 and 553, the multiplexer 554, and the gamma curve estimating and determining unit 555 shown in FIG. 18.

Figure 22:
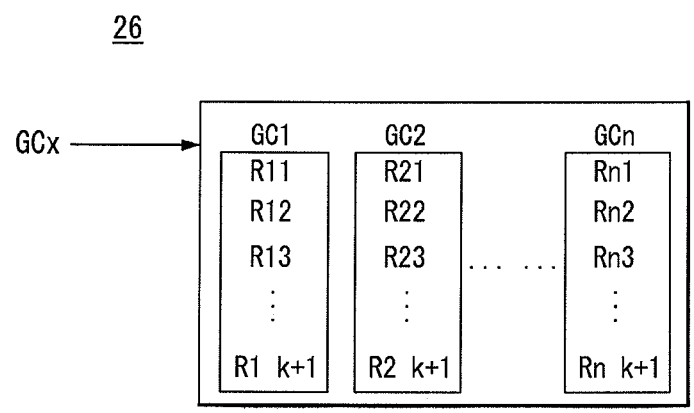
FIG. 22 illustrates a exemplary configuration of a gamma resistance setting unit.

As shown in FIG. 22, the gamma resistance setting unit 26 selects a gamma resistance determining information corresponding to a gamma curve information GCx determined by the gamma curve setting unit 25 among previously determined gamma resistance determining informations (R11-R1(k+1)) to (Rn1-Rn(k+1)) respectively corresponding to gamma curve informations GC1 to GCn to output the gamma resistance determining information as an electrical signal. The selected gamma resistance determining information is used to vary resistances of variable resistors constituting a gamma resistor string inside the gamma reference voltage conversion unit 27 and to modulate the gamma curve.

Figure 23:
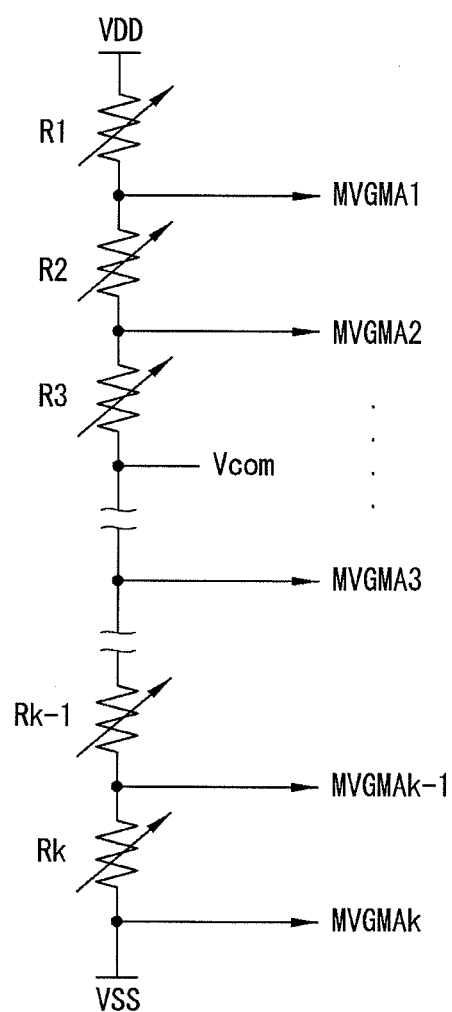
FIG. 23 illustrates a gamma reference voltage conversion unit.
Figure 24:
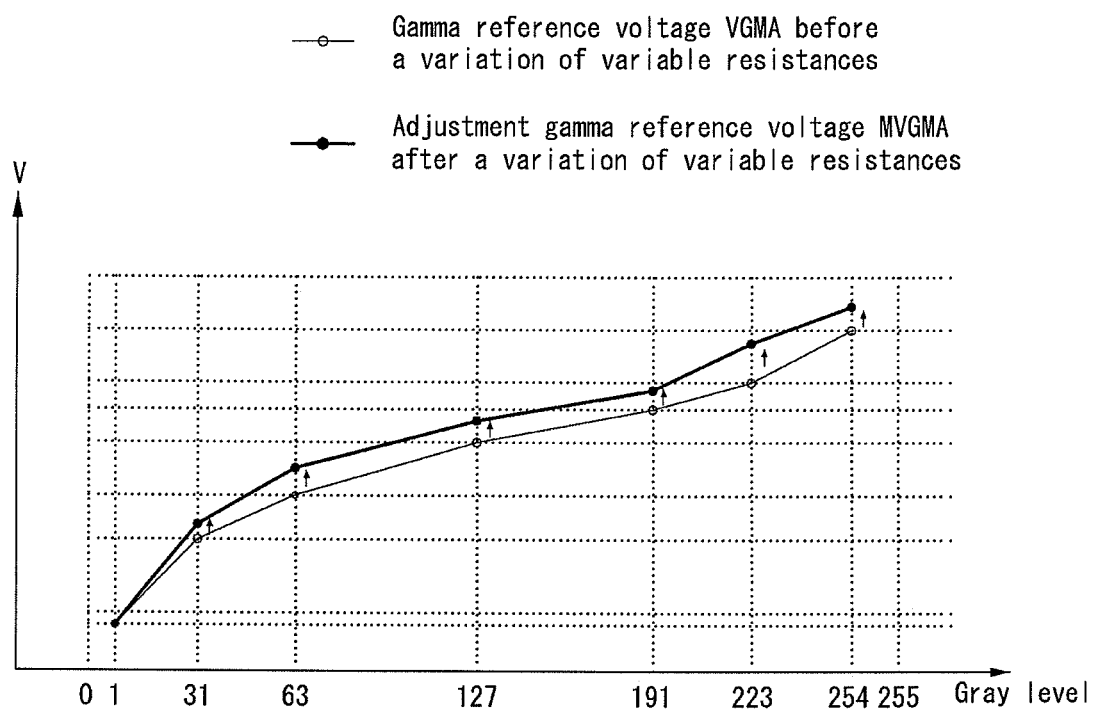
FIG. 24 is a graph showing a gamma curve modulated by an controlled gamma reference voltages.

As shown in FIG. 23, the gamma reference voltage conversion unit 27 includes a gamma resistor string including a plurality of variable resistors R1 to Rk dividing a voltage between a high voltage source VDD and a low voltage source VSS. A resistance of each of the variable resistors R1 to Rk is electrically varied in response to the gamma resistance determining information output by the gamma resistance setting unit 26. The variable resistors R1 to Rk may be implemented as a known digital resistor, a variable resistor using a transistor, and the like. The adjustment gamma reference voltages MVGMA1 to MVGMAk are generated through voltage division nodes between the variable resistors R1 to Rk. The gamma curve, as shown in FIG. 24, is modulated by the adjustment gamma reference voltages MVGMA1 to MVG-MAk. Hence, the relative brightness of the image the user perceives has a good linearity in all the gray level periods.

Figure 25:
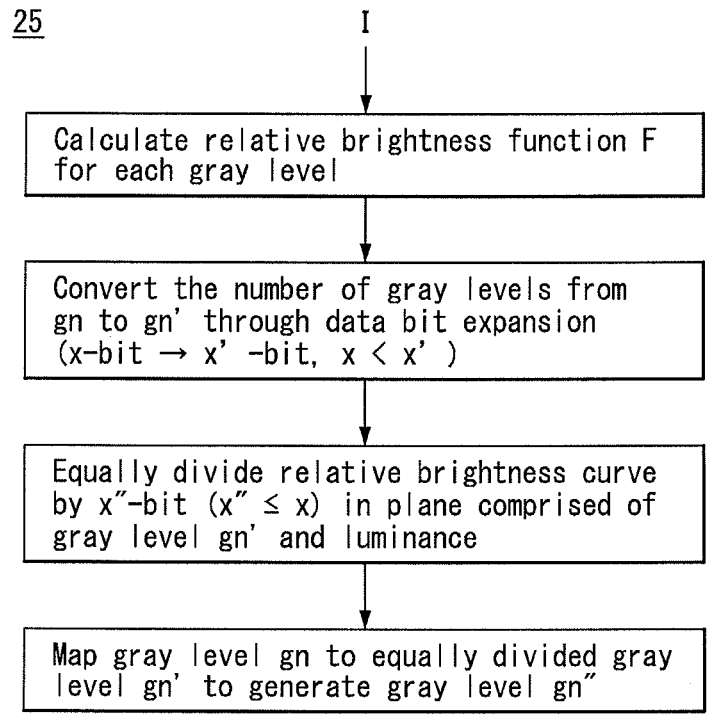
FIG. 25 illustrates an operation of the gamma curve setting unit.

The gamma curve setting unit 25 may operate as illustrated in FIG. 25. As shown in FIG. 25, the gamma curve setting unit 25 calculates a relative brightness function F for each gray level corresponding to the illuminance I of external light received from the external light sensing unit 24 based on a previously determined gamma curve. The relative brightness function F is defined by a relative brightness B of an image varying depending on a luminance L of input gray level as indicated in the above Equations 1 to 4. The luminance L of input gray level is affected by a reference gamma G, an illuminance I of external light, a maximum white luminance Max_L of the image, a surface reflectance R of the liquid crystal display panel 10, etc. The maximum white luminance Max_L of the image may be determined depending on a maximum gray level among gray levels of input data corresponding to one frame or depending on a minimum gray level based on a histogram analyzing result of input data corresponding to one frame. After the calculation of the relative brightness function F for each gray level is completed, the gamma curve setting unit 25 converts the number of gray levels from g0 to gn to g0 to gn' (refer to FIGS. 16A and 16B) through data bit expansion (data bit expansion from x-bit to x'-bit, x<x'). Subsequently, the gamma curve setting unit 25 equally divides a relative brightness curve BC in a plane comprised of the gray levels g0 to gn' and a luminance by x"-bit (x"≦x). In this case, the number of divided relative brightness curve BC is equal to the number of divided positive voltages or the number of divided negative voltages based on a common voltage Vcom of the gamma reference voltage conversion unit 27 shown in FIG. 23. Subsequently, the gamma curve setting unit 25 maps the gray levels go to gn to the equally divided gray levels g0 to gn' to generate gray levels g0 to gn" (refer to FIG. 16C).

Figure 26:
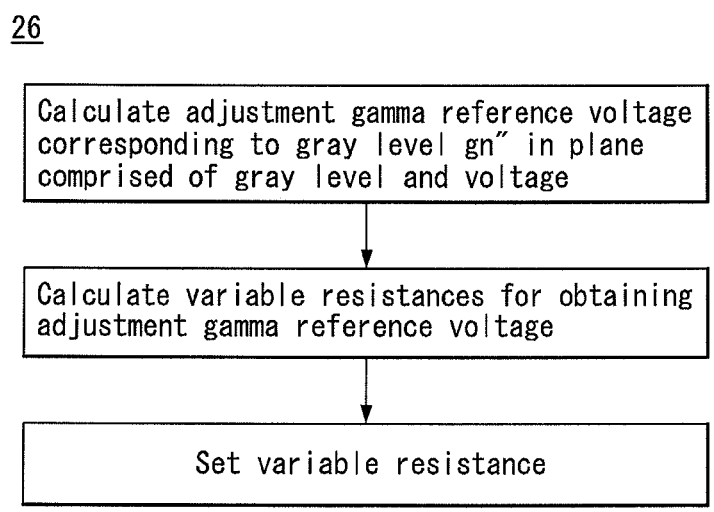
FIG. 26 illustrates an operation of the gamma resistance setting unit.

The gamma resistance setting unit 26 may operate as illustrated in FIG. 26. As shown in FIG. 26, the gamma resistance setting unit 26 calculates the adjustment gamma reference voltages MVGMA1 to MVGMAk corresponding to the gray levels g0 to gn" in a plane comprised of a gray level and a voltage shown in FIG. 24. The gamma resistance setting unit 26 calculates the variable resistances for obtaining the adjustment gamma reference voltages MVGMA1 to MVGMAk and selects the calculated variable resistances as the gamma resistance determining information. Then, the gamma resistance setting unit 26 outputs the gamma resistance determining information as an electrical signal.

As described above, in the liquid crystal display and the method of driving the same according to the embodiments of the disclosure, a relative brightness of an image the user perceives can be uniformly kept at an original brightness level of the image through for example, a modulation of input data irrespective of changes in watching environment and can have a good linearity in all of gray levels.

Furthermore, in the liquid crystal display and the method of driving the same according to the embodiments of the disclosure, a relative brightness of an image the user perceives can be uniformly kept at an original brightness level of the image through for example, an variation of resistances of variable resistors constituting a gamma resistor string, irrespective of changes in watching environment and can have a good linearity in all of gray levels.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A liquid crystal display comprising:
a liquid crystal display panel for displaying an image;
an external light sensing unit that senses an illuminance of external background light of the liquid crystal display panel; and
a gamma curve adjusting circuit that modulates digital video data based on the illuminance of external light and uniformly keeps a relative brightness of the image a user perceives irrespective of changes in the illuminance of external light,
wherein the gamma curve adjusting circuit includes:
a gamma curve setting unit for selecting a first gamma curve information corresponding to the illuminance of external light among gamma curve informations of each intensity of a previously determined illuminance of external light to output the first gamma curve information as a selected gamma curve information, so that the relative brightness of the image the user perceives has a good linearity in all of gray level periods;
a gamma curve estimating and determining unit calculating a relative brightness function for each gray level based on the first gamma curve information, comparing a linearity for each gray level of the relative brightness function with a previously determined reference value, and outputting the first gamma curve information or a second gamma curve information different from the first gamma curve information as the selected gamma curve information according to a comparison result; and
a data mapping unit for modulating the digital video data using a lookup table corresponding to the selected gamma curve information,
wherein the second gamma curve information has a maximum linearity for each gray level of the relative brightness function among the gamma curve informations other than the first gamma curve information,
wherein the relative brightness function is defined by the relative brightness of an image varying depending on a luminance of input gray level, and
wherein the reference value is a critical value for determining whether or not a relative brightness the user perceives has a good linearity in all of gray level periods irrespective of changes in an illuminance of external light.

2. A liquid crystal display comprising:
a liquid crystal display panel for displaying an image;
an external light sensing unit for sensing an illuminance of external light around the liquid crystal display panel; and
a gamma curve adjusting circuit for modulating digital video data based on the illuminance of external light to uniformly keep a relative brightness of the image a user perceives irrespective of changes in the illuminance of external light,
wherein the gamma curve adjusting circuit includes:
a gamma curve conversion controller calculating a relative brightness function for each gray level based on a reference gamma curve previously determined according to the illuminance of external light, comparing a linearity for each gray level of the relative brightness function with a previously determined reference value, and generating an operation control signal for a modulation of the digital video data; and
a gamma curve conversion unit expanding a number of gray levels from 2 k to 2 m through data bit expansion from k-bit to m-bit in response to the operation control signal, equally dividing a relative brightness curve in a plane comprised of the gray levels 2 m and a luminance by the k-bit, mapping the gray levels 2 k to the equally divided gray levels 2 m to change gray levels, and modulating the digital video data in conformity with the changed gray levels,
wherein the relative brightness function is defined by the relative brightness of an image varying depending on a luminance of input gray level, and
wherein the reference value is a critical value for determining whether or not a relative brightness the user perceives has a good linearity in all of gray level periods irrespective of changes in an illuminance of external light.

3. A liquid crystal display comprising:
a liquid crystal display panel for displaying an image;
an external light sensing unit for sensing an illuminance of external light around the liquid crystal display panel; and
a gamma curve adjusting circuit for modulating digital video data based on the illuminance of external light to uniformly keep a relative brightness of the image a user perceives irrespective of changes in the illuminance of external light,
wherein the gamma curve adjusting circuit includes:
a first gamma curve setting unit setting a first gamma curve information corresponding to each intensity of an illuminance information of external light and outputting a gamma curve information corresponding to the illuminance information of external light within a range including the illuminance of external light;
a second gamma curve setting unit outputting a gamma curve information corresponding to the illuminance of external light among second gamma curve information of each intensity of a previously determined illuminance of external light;
a multiplexer selecting one of outputs of the first and second gamma curve setting units as a first selection gamma curve information depending on whether or not the illuminance information of external light is included in the digital video data; and
a data mapping unit modulating the digital video data using a lookup table corresponding to the first selection gamma curve information,
wherein the illuminance information of external light is previously assigned to a data packet of the digital video data with several bits, wherein the gamma curve adjusting circuit further includes a gamma curve estimating and determining unit calculating a relative brightness function for each gray level based on the first selection gamma curve information, comparing a linearity for each gray level of the relative brightness function with a previously determined reference value, and outputting the first selection gamma curve information or a second selection gamma curve information different from the first selection gamma curve information according to a comparison result, wherein the second selection gamma curve information has a maximum linearity for each gray level of the relative brightness function among the gamma curve informations other than the first selection gamma curve information, wherein the relative brightness function is defined by the relative brightness of an image varying depending on a luminance of input gray level, and wherein the reference value is a critical value for determining whether or not a relative brightness the user perceives has a good linearity in all of gray level periods irrespective of changes in an illuminance of external light.

\* \* \* \* \*